(12) United States Patent
Leng et al.

(10) Patent No.: US 11,575,493 B2
(45) Date of Patent: Feb. 7, 2023

(54) TIME SYNCHRONIZATION METHOD AND APPARATUS, AND STORAGE MEDIUM

(71) Applicant: Huawei Technologies Co., Ltd., Shenzhen (CN)

(72) Inventors: Yueping Leng, Dongguan (CN); Kuichao Song, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 17/245,704

(22) Filed: Apr. 30, 2021

(65) Prior Publication Data
US 2021/0344475 A1  Nov. 4, 2021

(30) Foreign Application Priority Data

Apr. 30, 2020  (CN) .......................... 202010368231.3

(51) Int. Cl.
*H04L 7/00* (2006.01)
*H04B 3/54* (2006.01)

(52) U.S. Cl.
CPC .......... *H04L 7/0008* (2013.01); *H04B 3/542* (2013.01); *H04L 7/0016* (2013.01)

(58) Field of Classification Search
CPC .......... H04B 3/54; H04B 3/542; H04B 3/544; H04B 2203/542; H04J 3/0661; H04L 7/0008; H04L 7/0016
See application file for complete search history.

(56) References Cited

U.S. PATENT DOCUMENTS

| 8,879,379 B1 | 11/2014 | Razazian et al. |
| 2007/0025383 A1 | 2/2007 | Katar et al. |
| 2007/0025391 A1 | 2/2007 | Yonge, III et al. |

(Continued)

FOREIGN PATENT DOCUMENTS

| EP | 1908189 B1 | 11/2016 |
| JP | 2007037154 A | 2/2007 |

(Continued)

OTHER PUBLICATIONS

IEEE 1588V2, IEEE Std 1588-2008 (Revision of IEEE Std 1588-2002),IEEE Standard for a Precision Clock Synchronization Protocol for Networked Measurement and Control Systems,IEEE Instrumentation and Measurement Society,Technical Committee on Sensor Technology (TC-9),Jul. 24, 2008, 289 pages.

*Primary Examiner* — David B Lugo
(74) *Attorney, Agent, or Firm* — Conley Rose, P.C.

(57) ABSTRACT

A time synchronization method, applied to a power-line communication (PLC) network that includes a head end node and at least one tail end node coupled to the head end node. The method includes the head end node generates data about voltage zero-crossing points based on reference time, where the data about the voltage zero-crossing points includes zero-crossing time points of the voltage zero-crossing points. When a first timing point arrives, the head end node sends first information to the tail end node, where the first information includes a timestamp of a first zero-crossing point, the first zero-crossing point is a voltage zero-crossing point closest to the first timing point, and the timestamp of the first zero-crossing point is used by the tail end node to determine a zero-crossing time point of a second zero-crossing point.

20 Claims, 7 Drawing Sheets

(56) References Cited

U.S. PATENT DOCUMENTS

| | | | | |
|---|---|---|---|---|
| 2013/0101003 A1* | 4/2013 | Vedantham | ............. | H04B 3/54 375/224 |
| 2020/0235949 A1* | 7/2020 | Jones | ..................... | H04L 12/10 |

FOREIGN PATENT DOCUMENTS

| | | | |
|---|---|---|---|
| JP | 2009504016 | A | 1/2009 |
| JP | 2009504025 | A | 1/2009 |
| JP | 2016226279 | A | 12/2016 |
| KR | 20080038367 | A | 5/2008 |
| WO | 2007016031 | A2 | 2/2007 |
| WO | 2007016032 | A2 | 2/2007 |

* cited by examiner

TIME SYNCHRONIZATION METHOD AND APPARATUS, AND STORAGE MEDIUM

CROSS-REFERENCE TO RELATED APPLICATION

This application claims priority to Chinese Patent Application No. 202010368231.3 filed on Apr. 30, 2020, which is hereby incorporated by reference in its entirety.

TECHNICAL FIELD

The present disclosure relates to the field of power line communications technologies, and in particular, to a time synchronization method and apparatus, and a storage medium.

BACKGROUND

With construction of a power Internet of things develops, a scenario of using power-line communication (PLC) is extended from a previous meter communications unit to an Internet of things communications unit. In the scenario of power Internet of things, devices in a PLC network need to record electrical quantity waveform data such as a current and a voltage. In China, a frequency of an industrial-frequency alternating current is 50 hertz (Hz), and a cyclic wave of the alternating current is 20 milliseconds (ms). This requires that devices for data collection in the PLC network support time synchronization. In addition, time synchronization precision ensures that power data quality collected by different nodes in a same station (STA) simultaneously is in a same cycle, to ensure that current quality is determined correctly.

In an existing technology, for example, in the technical specifications of the data link layer communications protocol part in Low Voltage Power Line Broadband Communication Interoperability Technical Specification issued by the state grid, there is no specific stipulation on a method for implementing time synchronization between a head end node and a tail end node in a PLC network and time accuracy of the tail end node, provided that a necessary time sequence regulation is met. Therefore, in a current PLC network, vendors differ in an implementation method and accuracy of time synchronization precision between a central coordinator (CCO) at a head end of the PLC, and a proxy coordinator (PCO) and a STA that are at a tail end of the PLC, and synchronization accuracy of some products is low. A PLC network indicates longer synchronization time, more PLC network layers cause a larger error that even reaches a millisecond level. In this case, how to resolve the problem of poor time synchronization accuracy of products from different vendors so that all nodes in the PLC network can maintain precise time synchronization to avoid inconsistency of cyclic waves of synchronously collected data is an urgent problem to be resolved.

SUMMARY

Embodiments of this application provide a time synchronization method, to implement precise time synchronization between different nodes in a PLC network, to ensure that the nodes in the PLC network can maintain precise time synchronization, and avoid inconsistency of cyclic waves of synchronously collected data.

To achieve the foregoing objectives, this application provides the following technical solutions.

A first aspect of this application provides a time synchronization method. The method is applied to a PLC network. The PLC network includes a head end node and at least one tail end node connected to the head end node. The head end node may be a CCO, and the at least one tail end node may include one or more PCOs or one or more STAs. The head end node and the tail end node each have a function of detecting a voltage zero-crossing point. Further, a voltage zero-crossing detection circuit may be added to each of the head end node and the tail end node to detect a voltage zero-crossing point. In this method, the head end node generates data about voltage zero-crossing points based on reference time. The data about the voltage zero-crossing points includes zero-crossing time points of the voltage zero-crossing points. The head end node sends the data about the voltage zero-crossing points to the tail end node, so that the tail end node can determine zero-crossing time points of voltage zero-crossing points of the tail end node based on the zero-crossing time points. Further, the time synchronization method includes that the head end node generates the data about the voltage zero-crossing points based on the reference time. The data about the voltage zero-crossing points includes the zero-crossing time points of the voltage zero-crossing points, the reference time may be coordinated universal time. The coordinated universal time is also referred to as unified universal time, universal standard time, or coordinated international time, and is accurate time of a current moment. That the head end node generates the data about the voltage zero-crossing points based on the reference time is a continuous process. To be specific, the head end node generates corresponding data based on the reference time when each voltage zero-crossing point is generated. In this application, a first timing point may be determined based on a scale of the PLC network. The first timing point may be a multiple of 1 ms. For example, under a condition of an alternating current frequency 50 Hz used in China, the first timing point may be set to 200 voltage zero-crossings. When the first timing point arrives, the head end node sends first information to the tail end node. The first information may be a central beacon, the first information includes a timestamp of a first zero-crossing point, and the timestamp of the first zero-crossing point is a zero-crossing time point in the zero-crossing time points of the voltage zero-crossing points that has a smallest time interval with the first timing point. That is, the first zero-crossing point is a zero-crossing time point closest to the first timing point. The first information may be the central beacon, that is, the head end node may send, to the tail end node by using the central beacon, a timestamp of a closest voltage zero-crossing point when the first timing point arrives. The tail end node may be a PCO adjacent to the head end node, or a STA adjacent to the head end node. Driven by the voltage zero-crossing detection circuit, the tail end node also continuously generates zero-crossing time points of all voltage zero-crossing point. After receiving the first information sent by the head end node, the tail end node extracts the timestamp of the first zero-crossing point from the first information, and then determines a locally generated zero-crossing time point of a second zero-crossing point based on the timestamp of the first zero-crossing point.

It can be learned from the first aspect that, the head end node regularly sends a timestamp of a closest voltage zero-crossing point to the tail end node, so that the tail end node corrects a locally generated zero-crossing time point of a voltage zero-crossing point after receiving the timestamp of the closest voltage zero-crossing point. In this way, different nodes in the PLC network can implement precise time synchronization between the different nodes based on consistency and a periodicity that are generated based on the voltage zero-crossing points, to ensure that the nodes in the PLC network can maintain precise time synchronization, and avoid inconsistency of cyclic waves of synchronously collected data.

With reference to the first aspect, in a first possible implementation of the first aspect, the second zero-crossing point is a voltage zero-crossing point that is the same as the first zero-crossing point, the tail end node immediately modifies, after receiving the first information, a locally generated zero-crossing time point of the first zero-crossing point to the zero-crossing time point of the first zero-crossing point included in the received first information, and generates a zero-crossing time point of each voltage zero-crossing point based on the updated zero-crossing time point of the first zero-crossing point when a subsequent voltage zero-crossing point is generated.

It can be learned from the first possible implementation of the first aspect that, the head end node regularly sends a timestamp of a closest voltage zero-crossing point to the tail end node, so that the tail end node immediately corrects a locally generated zero-crossing time point of the closest voltage zero-crossing point after receiving the timestamp of the closest voltage zero-crossing point. In this way, different nodes in the PLC network can implement precise time synchronization in a timely manner between the different nodes based on consistency and a periodicity that are generated based on the voltage zero-crossing points, to ensure efficiency of implementing precise time synchronization by the nodes in the PLC network.

With reference to the first aspect or the first possible implementation of the first aspect, in a second possible implementation of the first aspect, when quality of a crystal oscillator used in the head end node and the tail end node is not high, in addition to a zero-crossing time point error, a detection error of a zero-crossing count may further occur between the head end node and the tail end node. In this case, the data about the voltage zero-crossing points generated by the head end node based on the reference time may further include zero-crossing counts of the voltage zero-crossing points, and the tail end node may determine, based on the zero-crossing counts of the voltage zero-crossing points generated by the head end node, zero-crossing counts of voltage zero-crossing points generated by the tail end node. Further, the first information sent by the head end node to the tail end node may further include a zero-crossing count of the first zero-crossing point. The tail end node extracts the timestamp and the zero-crossing count of the first zero-crossing point from the first information after receiving the first information sent by the head end node, and then determines the zero-crossing time point and a zero-crossing count of the second zero-crossing point based on the timestamp and the zero-crossing count of the first zero-crossing point.

It can be learned from the second possible implementation of the first aspect that, the head end node may carry the zero-crossing count of the first zero-crossing point in the first information sent to the tail end node, so that when quality of a crystal oscillator used in the head end node and the tail end node is not high, the tail end node corrects the generated zero-crossing count of the second zero-crossing point, to further improve accuracy of precise time synchronization between different nodes in the PLC network.

With reference to the second possible implementation of the first aspect, in a third possible implementation of the first aspect, when the second zero-crossing point is the same as the first zero-crossing point, the zero-crossing count of the second zero-crossing point is the same as the zero-crossing count of the first zero-crossing point. That is, when the second zero-crossing point is a voltage zero-crossing point that is the same as the first zero-crossing point, the tail end node modifies a locally generated zero-crossing count of the first zero-crossing point to the zero-crossing count of the first zero-crossing point included in the received first information.

With reference to any one of the first aspect, or the first to the third possible implementations of the first aspect, in a fourth possible implementation of the first aspect, the local time is current time locally recorded by the tail end node. There may be a deviation between the local time and the reference time, and the tail end node may calibrate the local time based on the timestamp of the first zero-crossing point.

It can be learned from the fourth possible implementation of the first aspect that, the tail end node may further calibrate the local time based on the timestamp of the first voltage zero-crossing point sent by the head end node, so that the local time of the tail end node can be precisely synchronized with the reference time.

With reference to any one of the first aspect, or the first to the fourth possible implementations of the first aspect, in a fifth possible implementation of the first aspect, the head end node may be further connected to one or more terminal devices, and the terminal device may be connected to the head end node through a universal asynchronous receiver/transmitter (UART) serial port. The head end node generates the data about the voltage zero-crossing points based on the reference time. The data about the voltage zero-crossing points includes the zero-crossing time points of the voltage zero-crossing points. The head end node sends the data about the voltage zero-crossing points to a terminal device connected to the head end node, so that the terminal device can determine zero-crossing time points of voltage zero-crossing points of the terminal device based on the zero-crossing time points. Further, after the head end node generates the data about the voltage zero-crossing points based on the reference time, the head end node sends second information to the terminal device when a second timing point arrives. The head end node may send the second information to a first terminal device through the UART serial port. The second timing point may be the same as the first timing point, or may be different from the first timing point. The second information includes a timestamp of a third zero-crossing point, and the third zero-crossing point is a voltage zero-crossing point closest to the second timing point. After receiving the second information, the terminal device determines a zero-crossing time point of a fourth zero-crossing point based on the timestamp of the third zero-crossing point carried in the second information.

It can be learned from the fifth possible implementation of the first aspect that, when the head end node in the PLC network is further connected to a terminal device, the head end node regularly sends a timestamp of a closest voltage zero-crossing point to the terminal device connected to the head end node, so that the terminal device corrects a locally generated zero-crossing time point of a voltage zero-crossing point after receiving the timestamp of the closest voltage zero-crossing point, to implement precise time synchronization with the head end node, thereby ensuring that precise time synchronization can be maintained between each node in the PLC network and a terminal device connected to the node, and avoiding inconsistency of cyclic waves of synchronously collected data.

With reference to the fifth possible implementation of the first aspect, in a sixth possible implementation of the first aspect, the data about the voltage zero-crossing points generated by the head end node based on the reference time further includes zero-crossing counts of the voltage zero-crossing points. In addition to the timestamp of the third zero-crossing point, the second information sent by the head end node to the terminal device connected to the head end node further includes a zero-crossing count of the third zero-crossing point. The terminal device determines a zero-crossing count of the fourth zero-crossing point based on the zero-crossing count of the third zero-crossing point. The fourth zero-crossing point may be a voltage zero-crossing point that is the same as the third zero-crossing point, or may be a voltage zero-crossing point that is different from the third zero-crossing point. For example, the fourth zero-crossing point is the $N^{th}$ voltage zero-crossing point generated after the third zero-crossing point. If the fourth zero-crossing point is a voltage zero-crossing point that is the same as the third zero-crossing point, the terminal device immediately modifies, after receiving the second information, a locally generated zero-crossing time point of the third zero-crossing point to the zero-crossing time point of the third zero-crossing point included in the received second information. If the fourth zero-crossing point is a voltage zero-crossing point that is different from the third zero-crossing point, for example, the fourth zero-crossing point is the $N^{th}$ voltage zero-crossing point after the third zero-crossing point, after the first terminal device receives the second information, when the fourth zero-crossing point is generated, if the timestamp of the third zero-crossing point is $T_3$, a time point at which the fourth zero-crossing point is generated is $T_3+aN$, where a represents a time interval between zero-crossing time points of every two adjacent voltage zero-crossing points.

It can be learned from the sixth possible implementation of the first aspect that, when the head end node and the terminal device do not share a crystal oscillator, or quality of a used crystal oscillator is not high, the head end node may carry the zero-crossing count of the third zero-crossing point in the second information sent to the terminal device, so that the terminal device corrects the generated zero-crossing count of the fourth zero-crossing point, thereby improving accuracy of precise time synchronization.

With reference to the fifth or the sixth possible implementation of the first aspect, in a seventh possible implementation of the first aspect, the timestamp of the third zero-crossing point is further used by the terminal device to calibrate local time. Further, the local time of the terminal device is current time locally recorded by the terminal device, and there may be a deviation between the local time and the reference time. The terminal device may calibrate the local time based on the timestamp of the third zero-crossing point.

With reference to any one of the first aspect, or the first to the seventh possible implementations of the first aspect, in an eighth possible implementation of the first aspect, before the head end node generates the data about the voltage zero-crossing points based on the reference time, the method further includes that the head end node obtains the reference time. The head end node may obtain the reference time from an upstream device, for example, a management node, or a clock source such as a Global Positioning System (GPS) or BEIDOU. The head end node can periodically or regularly obtain the reference time from an upstream device.

It can be learned from the eighth possible implementation of the first aspect that, the head end node may periodically or regularly obtain the reference time, and then generate the data about the voltage zero-crossing points based on the reference time, to implement precise time synchronization with the tail end node. In this way, it can be ensured that time of different nodes in the PLC network can be aligned with the reference time.

A second aspect of this application provides a time synchronization method. The method is applied to a PLC network, and the PLC network includes a head end node and at least one tail end node connected to the head end node. The head end node may be a CCO, and the at least one tail end node may include one or more PCOs or one or more STAs. The head end node and the tail end node each have a function of detecting a voltage zero-crossing point. Further, a voltage zero-crossing detection circuit may be added to each of the head end node and the tail end node to detect a voltage zero-crossing point. In this method, the head end node generates zero-crossing time points of voltage zero-crossing points based on reference time, and a first tail end node receives the zero-crossing time points of the voltage zero-crossing points sent by the head end node, so that the first tail end node can determine a zero-crossing time point of a voltage zero-crossing point of the first tail end node based on the zero-crossing time point. Further, the first tail end node receives first information sent by the head end node when a first timing point arrives. The first information includes a timestamp of a first zero-crossing point, and the timestamp of the first zero-crossing point is a zero-crossing time point in the zero-crossing time points of the voltage zero-crossing points that is closest to the first timing point, where the zero-crossing time points of the voltage zero-crossing points are generated by the head end node based on the reference time. The first information may be a central beacon, that is, the head end node may send, to the first tail end node by using the central beacon, the timestamp of the closest voltage zero-crossing point when the first timing point arrives. Driven by the voltage zero-crossing detection circuit, the first tail end node also continuously generates zero-crossing time points of all voltage zero-crossing points. After receiving the first information sent by the head end node, the first tail end node extracts the timestamp of the first zero-crossing point from the first information, and then determines a locally generated zero-crossing time point of a second zero-crossing point based on the timestamp of the first zero-crossing point.

It can be learned from the second aspect that, the head end node regularly sends a timestamp of a closest voltage zero-crossing point to the first tail end node, so that the first tail end node corrects a locally generated zero-crossing time point of a voltage zero-crossing point after receiving the timestamp of the closest voltage zero-crossing point. In this way, different nodes in the PLC network can implement precise time synchronization between the different nodes based on consistency and a periodicity that are generated based on the voltage zero-crossing points, to ensure that the nodes in the PLC network can maintain precise time synchronization, and avoid inconsistency of cyclic waves of synchronously collected data.

With reference to the second aspect, in a first possible implementation of the second aspect, when the first zero-crossing point is the same as the second zero-crossing point, a zero-crossing time point of the second zero-crossing point is the same as a timestamp of the first zero-crossing point. Further, the second zero-crossing point is a voltage zero-crossing point that is the same as the first zero-crossing point, the tail end node immediately modifies, after receiving the first information, a locally generated zero-crossing time point of the first zero-crossing point to the zero-crossing time point of the first zero-crossing point included in the received first information, and generates a zero-crossing time point of each voltage zero-crossing point based on the updated zero-crossing time point of the first zero-crossing point when a subsequent voltage zero-crossing point generated.

It can be learned from the first possible implementation of the second aspect that, the head end node regularly sends a timestamp of a closest voltage zero-crossing point to the first tail end node, so that the first tail end node immediately corrects a locally generated zero-crossing time point of the closest voltage zero-crossing point after receiving the timestamp of the closest voltage zero-crossing point. In this way, different nodes in the PLC network can implement precise time synchronization in a timely manner between the different nodes based on consistency and a periodicity that are generated based on the voltage zero-crossing points, to ensure efficiency of implementing precise time synchronization by the nodes in the PLC network.

With reference to the second aspect or the first possible implementation of the second aspect, in a second possible implementation of the second aspect, when quality of a crystal oscillator used in the head end node and the first tail end node is not high, in addition to a zero-crossing time point error, a detection error of a zero-crossing count may further occur between the head end node and the first tail end node. In this case, the data about the voltage zero-crossing points generated by the head end node based on the reference time may further include zero-crossing counts of the voltage zero-crossing points. The first information further includes a zero-crossing count of the first zero-crossing point. The first tail end node extracts the timestamp and the zero-crossing count of the first zero-crossing point from the first information after receiving the first information sent by the head end node when the first timing point arrives, and then determines the zero-crossing time point and a zero-crossing count of the second zero-crossing point based on the timestamp and the zero-crossing count of the first zero-crossing point.

It can be learned from the second possible implementation of the second aspect that, the head end node may carry the zero-crossing count of the first zero-crossing point in the first information sent to the first tail end node, so that when quality of a crystal oscillator used in the head end node and the first tail end node is not high, the first tail end node corrects the generated zero-crossing count of the second zero-crossing point, to further improve accuracy of precise time synchronization between different nodes in the PLC network.

With reference to the second possible implementation of the second aspect, in a third possible implementation of the second aspect, when the second zero-crossing point is the same as the first zero-crossing point, the zero-crossing count of the second zero-crossing point is the same as the zero-crossing count of the first zero-crossing point. Further, when the second zero-crossing point is a voltage zero-crossing point that is the same as the first zero-crossing point, the tail end node modifies a locally generated zero-crossing count of the first zero-crossing point to the zero-crossing count of the first zero-crossing point included in the received first information.

With reference to any one of the second aspect, or the first to the third possible implementations of the second aspect, in a fourth possible implementation of the second aspect, after the first tail end node receives the first information sent by the head end node when the first timing point arrives, the method further includes that the tail end node calibrates the local time based on the timestamp of the first zero-crossing point. Further, the local time is current time locally recorded by the tail end node. There may be a deviation between the local time and the reference time, and the tail end node may calibrate the local time based on the timestamp of the first zero-crossing point.

It can be learned from the fourth possible implementation of the second aspect that, the first tail end node may further calibrate the local time based on the timestamp of the first voltage zero-crossing point sent by the head end node, so that the local time of the first tail end node can be precisely synchronized with the reference time.

With reference to any one of the second aspect, or the first to the fourth possible implementations of the second aspect, in a fifth possible implementation of the second aspect, the first tail end node is connected to one or more terminal devices. The first tail end node may be connected to the terminal device through a UART serial port. After implementing precise time synchronization with the head end node, the first tail end node generates a zero-crossing time point of a voltage zero-crossing point based on the timestamp of the second zero-crossing point, and the first tail end node sends the data about the voltage zero-crossing points to a terminal device connected to the first tail end node, so that the terminal device can determine zero-crossing time points of voltage zero-crossing points of the terminal device based on the zero-crossing time points. After the first tail end node determines the zero-crossing time point of the second zero-crossing point based on the timestamp of the first zero-crossing point, the method further includes that the first tail end node generates data about voltage zero-crossing points based on the zero-crossing time point of the second zero-crossing point. The data about the voltage zero-crossing point includes zero-crossing time points of the voltage zero-crossing point. When a second timing point arrives, the first tail end node sends second information to the terminal device. The second information includes a timestamp of a third zero-crossing point, and the timestamp of the third zero-crossing point is a zero-crossing time point in the zero-crossing time points of the voltage zero-crossing points that has a smallest time interval with the second timing point, where the zero-crossing time points of the voltage zero-crossing points are generated by the first tail end node based on the zero-crossing time point of the second zero-crossing point. That is, the third zero-crossing point is a voltage zero-crossing point closest to the second timing point. The terminal device determines a zero-crossing time point of a fourth zero-crossing point based on the timestamp of the third zero-crossing point.

It can be learned from the fifth possible implementation of the second aspect that, when the tail end node in the PLC network is further connected to a terminal device, the terminal device connected to the tail end node in the PLC network may also be enabled to implement precise time synchronization with the tail end node based on consistency and a periodicity that are generated based on a voltage zero-crossing point. In this way, it is ensured that precise time synchronization can be maintained between each node in the PLC network and a terminal device connected to the node, and inconsistency of cyclic waves of synchronously collected data is avoided.

With reference to the fifth possible implementation of the second aspect, in a sixth possible implementation of the second aspect, the data about the voltage zero-crossing points further includes zero-crossing counts of the voltage zero-crossing points. The second information further includes a zero-crossing count of the third zero-crossing point. The terminal device determines a zero-crossing count of the fourth zero-crossing point based on the zero-crossing count of the third zero-crossing point.

With reference to the fifth or the sixth possible implementation of the second aspect, in a seventh possible implementation of the second aspect, the terminal device calibrates the local time based on the timestamp of the third zero-crossing point.

With reference to the fifth possible implementation of the second aspect, in an eighth possible implementation of the second aspect, the first tail end node is further connected to a second tail end node. After implementing precise time synchronization with the head end node, the first tail end node generates the data about the voltage zero-crossing points based on the timestamp of the second zero-crossing point. The first tail end node sends the data about the voltage zero-crossing points to the second tail end node connected to the first tail end node, so that the second tail end node can determine a zero-crossing time point of a voltage zero-crossing point of the second tail end node based on the zero-crossing time point. Further, after the first tail end node generates the data about the voltage zero-crossing points based on the zero-crossing time point of the second zero-crossing point, the first tail end node sends third information to the second tail end node when the third timing point arrives. The third timing point may be the same as at least one of the first timing point and the second timing point, or may be different from both the first timing point and the second timing point. The third information includes a timestamp of a fifth zero-crossing point, and the timestamp of the fifth zero-crossing point is a zero-crossing time point in the zero-crossing time points of the voltage zero-crossing points that has a smallest time interval with the third timing point, where zero-crossing time points of the voltage zero-crossing points are generated by the first tail end node based on the zero-crossing time point of the second zero-crossing point, that is, the fifth zero-crossing point is a closest voltage zero-crossing point generated closest to the third timing point. The second tail end node determines a zero-crossing time point of a sixth zero-crossing point based on the timestamp of the fifth zero-crossing point.

With reference to the eighth possible implementation of the second aspect, in a ninth possible implementation of the second aspect, after the first tail end node implements precise time synchronization with the head end node, the generated data about the voltage zero-crossing points further includes zero-crossing point counts of the voltage zero-crossing points. If quality of a crystal oscillator used in the first tail end node and the second tail end node is not high, the third information sent by the first tail end node to the second tail end node further includes a zero-crossing count of the fifth zero-crossing point. The zero-crossing count of the fifth zero-crossing point is used by the second tail end node to determine a zero-crossing count of the sixth zero-crossing point.

A third aspect of this application provides a time synchronization method. The method is applied to a PLC network, the PLC network includes a head end node and at least one tail end node connected to the head end node, and at least one of the head end node and the at least one tail end node is connected to at least one terminal device. The head end node may be a CCO, and the at least one tail end node may include one or more PCOs or one or more STAs. The head end node and the tail end node each have a function of detecting a voltage zero-crossing point. Further, a voltage zero-crossing detection circuit may be added to each of the head end node and the tail end node to detect a voltage zero-crossing point. In the method, the head end node or the tail end node generates data about voltage zero-crossing points. The data about the voltage zero-crossing points includes zero-crossing time points of the voltage zero-crossing points. The head end node or the tail end node sends the data about the voltage zero-crossing points to a terminal device connected to the head end node or the tail end node, so that the terminal device can determine zero-crossing time points of voltage zero-crossing points of the terminal device based on the zero-crossing time points. Further, the method includes that the terminal device receives first information sent by a first node when a first timing point arrives. The first information includes a timestamp of a first zero-crossing point, and the timestamp of the first zero-crossing point is a zero-crossing time point in the zero-crossing time points of the voltage zero-crossing points that has a smallest time interval with the first timing point, where the zero-crossing time points of the voltage zero-crossing points are generated by the first node. The terminal device determines a timestamp of a second zero-crossing point based on the timestamp of the first zero-crossing point.

It can be learned from the third aspect that, when the head end node or the tail end node in the PLC network is connected to a terminal device, the head end node or the tail end node regularly sends a timestamp of a closest voltage zero-crossing point to the terminal device connected to the head end node or the tail end node, so that the terminal device corrects a locally generated zero-crossing time point of the voltage zero-crossing point after receiving the timestamp of the closest voltage zero-crossing point, to implement precise time synchronization with the head end node or the tail end node, thereby ensuring that precise time synchronization can be maintained between each node in the PLC network and a terminal device connected to the node, and avoiding inconsistency of cyclic waves of synchronously collected data.

With reference to the third aspect, in a first possible implementation of the third aspect, when the first node is the head end node, the zero-crossing time points of the voltage zero-crossing points are generated by the first node based on reference time. Further, the head end node generates the data about the voltage zero-crossing points based on the reference time. The data about the voltage zero-crossing points includes zero-crossing time points of the voltage zero-crossing points. The head end node sends the data about the voltage zero-crossing points to the terminal device connected to the head end node, so that the terminal device can determine zero-crossing time points of voltage zero-crossing points of the terminal device based on the zero-crossing time points, thereby implementing precise time synchronization between the head end node and the terminal device.

With reference to the third aspect, in a second possible implementation of the third aspect, when the first node is the tail end node, the zero-crossing time points of the voltage zero-crossing points are generated by the first node based on a timestamp of a third zero-crossing point. The timestamp of the third zero-crossing point is sent by a second node to the first node when a second timing point arrives, and the timestamp of the third zero-crossing point is a zero-crossing time point in timestamps of voltage zero-crossing points that has a smallest time interval with the second timing point, where the timestamps of the voltage zero-crossing points are generated by the second node. Further, the tail end node generates the data about the voltage zero-crossing points after implementing precise time synchronization with the head end node. The data about the voltage zero-crossing points includes the zero-crossing time points of the voltage zero-crossing points. The tail end node sends the data about the voltage zero-crossing points to the terminal device connected to the tail end node, so that the terminal device can determine zero-crossing time points of voltage zero-crossing points of the terminal device based on the zero-crossing time points, thereby implementing precise time synchronization between the tail end node and the terminal device.

With reference to any one of the third aspect, or the first and the second possible implementations of the third aspect, in a third possible implementation of the third aspect, the first information further includes a zero-crossing count of the first zero-crossing point, and the method further includes that the terminal device determines a zero-crossing count of the second zero-crossing point based on the zero-crossing count of the first zero-crossing point.

With reference to any one of the third aspect, or the first to the third possible implementations of the third aspect, in a fourth possible implementation of the third aspect, after the terminal device receives the first information sent by the first node when the first timing point arrives, the method further includes that the terminal device calibrates local time based on the timestamp of the first zero-crossing point.

A fourth aspect of this application provides a network device. The network device is used in a PLC network, the network device is a head end node, and the PLC network further includes at least one tail end node connected to the head end node. The network device includes a generation unit configured to generate data about voltage zero-crossing points based on reference time, where the data about the voltage zero-crossing points includes zero-crossing time points of the voltage zero-crossing points, and a sending unit configured to, when a first timing point arrives, send first information to the tail end node, where the first information includes a timestamp of a first zero-crossing point, the timestamp of the first zero-crossing point is a zero-crossing time point in the zero-crossing time points of the voltage zero-crossing points that has a smallest time interval with the first timing point, and the timestamp of the first zero-crossing point is used by the tail end node to determine a zero-crossing time point of a second zero-crossing point, where the zero-crossing time points of the voltage zero-crossing points are generated by the generation unit.

With reference to the fourth aspect, in a first possible implementation of the fourth aspect, when the second zero-crossing point is the same as the first zero-crossing point, the zero-crossing time point of the second zero-crossing point is the same as the timestamp of the first zero-crossing point.

With reference to the fourth aspect or the first possible implementation of the fourth aspect, in a second possible implementation of the fourth aspect, the data about the voltage zero-crossing points further includes zero-crossing counts of the voltage zero-crossing points, the first information further includes a zero-crossing count of the first zero-crossing point, and the zero-crossing count of the first zero-crossing point is used by the tail end node to determine a zero-crossing count of the second zero-crossing point.

With reference to the second possible implementation of the fourth aspect, in a third possible implementation of the fourth aspect, when the second zero-crossing point is the same as the first zero-crossing point, the zero-crossing count of the second zero-crossing point is the same as the zero-crossing count of the first zero-crossing point.

With reference to any one of the fourth aspect, or the first to the third possible implementations of the fourth aspect, in a fourth possible implementation of the fourth aspect, the timestamp of the first zero-crossing point is further used by the tail end node to calibrate local time.

With reference to any one of the fourth aspect, or the first to the fourth possible implementations of the fourth aspect, in a fifth possible implementation of the fourth aspect, the network device is connected to the terminal device, and the sending unit is further configured to, after the generation unit generates the data about the voltage zero-crossing points based on the reference time, second information to the terminal device when a second timing point arrives, where the second information includes a timestamp of a third zero-crossing point, the timestamp of the third zero-crossing point is a zero-crossing time point in the zero-crossing time points of the voltage zero-crossing points that has a smallest time interval with the second timing point, and the timestamp of the third zero-crossing point is used by the terminal device to determine a zero-crossing time point of a fourth zero-crossing point.

With reference to the fifth possible implementation of the fourth aspect, in a sixth possible implementation of the fourth aspect, the data about the voltage zero-crossing points further includes the zero-crossing counts of the voltage zero-crossing points, the second information further includes a zero-crossing count of the third zero-crossing point, and the zero-crossing count of the third zero-crossing point is used by the terminal device to determine a zero-crossing count of the fourth zero-crossing point.

With reference to the fifth or the sixth possible implementation of the fourth aspect, in a seventh possible implementation of the fourth aspect, the timestamp of the third zero-crossing point is further used by the terminal device to calibrate the local time.

With reference to any one of the fourth aspect, or the first to the seventh possible implementations of the fourth aspect, in an eighth possible implementation of the fourth aspect, the network device further includes an obtaining unit configured to, before the generation unit generates the data about the voltage zero-crossing points based on the reference time, obtain the reference time.

A fifth aspect of this application provides a network device. The network device is used in a PLC network, the network device is a first tail end node, and the PLC network further includes a head end node connected to the first tail end node. The network device includes a receiving unit configured to receive first information sent by the head end node when a first timing point arrives, where the first information includes a timestamp of a first zero-crossing point, and the timestamp of the first zero-crossing point is a zero-crossing time point in zero-crossing time points of voltage zero-crossing points that has a smallest time interval with the first timing point, where the zero-crossing time points of the voltage zero-crossing points are generated by the head end node based on reference time, and a determining unit configured to determine a zero-crossing time point of a second zero-crossing point based on the timestamp of the first zero-crossing point in the first information received by the receiving unit.

With reference to the fifth aspect, in a first possible implementation of the fifth aspect, when the first zero-crossing point is the same as the second zero-crossing point, the zero-crossing time point of the second zero-crossing point is the same as the timestamp of the first zero-crossing point.

With reference to the fifth aspect or the first possible implementation of the fifth aspect, in a second possible implementation of the fifth aspect, the first information further includes a zero-crossing count of the first zero-crossing point, and the determining unit is further configured to, after the receiving unit receives the first information sent by the head end node when the first timing point arrives, determine a zero-crossing count of the second zero-crossing point based on the zero-crossing count of the first zero-crossing point.

With reference to the second possible implementation of the fifth aspect, in a third possible implementation of the fifth aspect, when the second zero-crossing point is the same as the first zero-crossing point, the zero-crossing count of the second zero-crossing point is the same as the zero-crossing count of the first zero-crossing point.

With reference to any one of the fifth aspect, or the first to the third possible implementations of the fifth aspect, in a fourth possible implementation of the fifth aspect, the network device further includes a calibration unit configured to, after the receiving unit receives the first information sent by the head end node when the first timing point arrives, calibrate local time based on the timestamp of the first zero-crossing point.

With reference to any one of the fifth aspect, or the first to the fourth possible implementations of the fifth aspect, in a fifth possible implementation of the fifth aspect, the first tail end node is connected to the terminal device, and the network device further includes a generation unit configured to, after the determining unit determines the zero-crossing time point of the second zero-crossing point based on the timestamp of the first zero-crossing point, generate data about voltage zero-crossing points based on the zero-crossing time point of the second zero-crossing point, where the data about the voltage zero-crossing points includes zero-crossing time points of the voltage zero-crossing points, and a sending unit configured to send second information to the terminal device when a second timing point arrives, where the second information includes a timestamp of a third zero-crossing point, the timestamp of the third zero-crossing point is a zero-crossing time point in the zero-crossing time points of the voltage zero-crossing points that has a smallest time interval with the second timing point, and the timestamp of the third zero-crossing point is used by the terminal device to determine a zero-crossing time point of a fourth zero-crossing point, where the zero-crossing time points of the voltage zero-crossing points are generated by the generation unit.

With reference to the fifth possible implementation of the fifth aspect, in a sixth possible implementation of the fifth aspect, the data about the voltage zero-crossing points further includes zero-crossing counts of the voltage zero-crossing points, the second information further includes a zero-crossing count of the third zero-crossing point, and the zero-crossing count of the third zero-crossing point is used by the terminal device to determine a zero-crossing count of the fourth zero-crossing point.

With reference to the fifth or the sixth possible implementation of the fifth aspect, in a seventh possible implementation of the fifth aspect, the timestamp of the third zero-crossing point is further used by the terminal device to calibrate the local time.

With reference to the fifth possible implementation of the fifth aspect, in an eighth possible implementation of the fifth aspect, the sending unit is further configured to, when a third timing point arrives, send third information to a second tail end node, where the third information includes a timestamp of a fifth zero-crossing point, the timestamp of the fifth zero-crossing point is a zero-crossing time point in the zero-crossing time points of the voltage zero-crossing points that has a smallest time interval with the third timing point, and the timestamp of the fifth zero-crossing point is used by the second tail end node to determine a zero-crossing time point of a sixth zero-crossing point, where the zero-crossing time points of the voltage zero-crossing points are generated by the generation unit.

With reference to the eighth possible implementation of the fifth aspect, in a ninth possible implementation of the fifth aspect, the data about the voltage zero-crossing points further includes zero-crossing counts of the voltage zero-crossing points, the third information further includes a zero-crossing count of the fifth zero-crossing point, and the zero-crossing count of the fifth zero-crossing point is used by the second tail end node to determine a zero-crossing count of the sixth zero-crossing point.

A sixth aspect of this application provides a terminal device. The terminal device is used in a PLC network, the PLC network includes a head end node and at least one tail end node connected to the head end node, and at least one of the head end node and the at least one tail end node is connected to at least one terminal device. The terminal device includes a receiving unit configured to receive first information sent by a first node when a first timing point arrives, where the first information includes a timestamp of a first zero-crossing point, and the timestamp of the first zero-crossing point is a zero-crossing time point in zero-crossing time points of voltage zero-crossing points that has a smallest time interval with the first timing point, where the zero-crossing time points of the voltage zero-crossing points are generated by the first node, and a determining unit configured to determine a timestamp of a second zero-crossing point based on the timestamp of the first zero-crossing point in the first information received by the receiving unit.

With reference to the sixth aspect, in a first possible implementation of the sixth aspect, when the first node is the head end node, the zero-crossing time points of the voltage zero-crossing points are generated by the first node based on reference time.

With reference to the sixth aspect, in a second possible implementation of the sixth aspect, when the first node is the tail end node, the zero-crossing time points of the voltage zero-crossing points are generated by the first node based on a timestamp of a third zero-crossing point. The timestamp of the third zero-crossing point is sent by a second node to the first node when a second timing point arrives, and the timestamp of the third zero-crossing point is a zero-crossing time point in timestamps of voltage zero-crossing points that has a smallest time interval with the second timing point, where the timestamps of the voltage zero-crossing points are generated by the second node.

With reference to any one of the sixth aspect, or the first and the second possible implementations of the sixth aspect, in a third possible implementation of the sixth aspect, the first information further includes a zero-crossing count of the first zero-crossing point, and the determining unit is further configured to determine a zero-crossing count of the second zero-crossing point based on the zero-crossing count of the first zero-crossing point.

With reference to any one of the sixth aspect, or the first to the third possible implementations of the sixth aspect, in a fourth possible implementation of the sixth aspect, the terminal device further includes a calibration unit configured to, after the receiving unit receives the first information sent by the first node when the first timing point arrives, calibrate local time based on the timestamp of the first zero-crossing point.

A seventh aspect of this application provides a network device. The network device includes a processor and a memory. The memory is configured to store a computer-readable instruction (or a computer program), and the processor is configured to read the computer-readable instruction to implement the method that is related to the head end node and that is provided in any one of the foregoing aspects and the implementations thereof.

In some implementations, the network device further includes a transceiver configured to receive and send data.

An eighth aspect of this application provides a network device. The network device includes a processor and a memory. The memory is configured to store a computer-readable instruction (or a computer program), and the processor is configured to read the computer-readable instruction to implement the method that is related to the tail end node and that is provided in any one of the foregoing aspects and the implementations thereof.

In some implementations, the network device further includes a transceiver configured to receive and send data.

A ninth aspect of this application provides a terminal device. The terminal device includes a processor and a memory. The memory is configured to store a computer-readable instruction (or a computer program), and the processor is configured to read the computer-readable instruction to implement the method that is related to the terminal device and that is provided in any one of the foregoing aspects and the implementations thereof.

In some implementations, the terminal device further includes a transceiver configured to receive and send data.

A tenth aspect of this application provides an apparatus. The apparatus has a function of implementing actions of the head end node in any one of the first aspect or the possible implementations of the first aspect, and the apparatus includes means corresponding to the steps or the functions described in any one of the first aspect or the possible implementations of the first aspect. The steps or functions may be implemented by using software, hardware (for example, a circuit), or a combination of hardware and software.

In a possible design, the apparatus includes one or more processors and a communications unit. The one or more processors are configured to support the apparatus in implementing corresponding functions of the head end node in the foregoing methods. The communications unit is configured to support the apparatus in communicating with another device, to implement a receiving function and/or a sending function.

Optionally, the apparatus may further include one or more memories. The memory is coupled to the processor, and the memory stores a program instruction and/or data that are/is necessary for the apparatus. The one or more memories may be integrated with the processor, or may be disposed independent of the processor. This is not limited in this application.

The apparatus may be a PLC module or the like, and the communications unit may be a transceiver or a transceiver circuit. Optionally, the transceiver may alternatively be an input/output circuit or an interface.

The apparatus may alternatively be a chip system. The communications unit may be an input/output circuit or an interface of the chip system.

In another possible design, the apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the head end node in any one of the first aspect or the possible implementations of the first aspect.

An eleventh aspect of this application provides an apparatus. The apparatus has a function of implementing actions of the tail end node in any one of the second aspect or the possible implementations of the second aspect, and the apparatus includes means corresponding to the steps or the functions described in any one of the second aspect or the possible implementations of the second aspect. The steps or functions may be implemented by using software, hardware (for example, a circuit), or a combination of hardware and software.

In a possible design, the apparatus includes one or more processors and a communications unit. The one or more processors are configured to support the apparatus in implementing corresponding functions of the tail end node in the foregoing methods. The communications unit is configured to support the apparatus in communicating with another device, to implement a receiving function and/or a sending function.

Optionally, the apparatus may further include one or more memories. The memory is coupled to the processor, and the memory stores a program instruction and/or data that are/is necessary for a network device. The one or more memories may be integrated with the processor, or may be disposed independent of the processor. This is not limited in this application.

The apparatus may be a PLC module, and the communications unit may be a transceiver or a transceiver circuit. Optionally, the transceiver may alternatively be an input/output circuit or an interface.

The apparatus may alternatively be a chip system. The communications unit may be an input/output circuit or an interface of the chip system.

In another possible design, the apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the tail end node in any one of the second aspect or the possible implementations of the second aspect.

A twelfth aspect of this application provides a PLC communications system. The system includes the foregoing head end node and the foregoing at least one tail end node connected to the head end node.

With reference to the twelfth aspect, in a first possible implementation of the twelfth aspect, the PLC communications system further includes the at least one terminal device described above.

A thirteenth aspect of this application provides a computer-readable storage medium. The computer-readable storage medium is configured to store a computer program. The computer program includes an instruction used to perform the method, related to the head end node, in any one of the first aspect or the possible implementations of the first aspect.

A fourteenth aspect of this application provides a computer-readable storage medium. The computer-readable storage medium is configured to store a computer program. The computer program includes an instruction used to perform the method, related to the tail end node, in any one of the second aspect or the possible implementations of the second aspect.

A fifteenth aspect of this application provides a computer-readable storage medium. The computer-readable storage medium is configured to store a computer program. The computer program includes an instruction used to perform the method, related to the terminal device, in any one of the third aspect or the possible implementations of the third aspect.

A sixteenth aspect of this application provides a computer program product. The computer program product includes computer program code. When the computer program code is run on a computer, the computer is enabled to perform the method, related to the head end node, in any one of the first aspect or the possible implementations of the first aspect.

A seventeenth aspect of this application provides a computer program product. The computer program product includes computer program code. When the computer program code is run on a computer, the computer is enabled to perform the method, related to the tail end node, in any one of the second aspect or the possible implementations of the second aspect.

An eighteenth aspect of this application provides a computer program product. The computer program product includes computer program code. When the computer program code is run on a computer, the computer is enabled to perform the method, related to the terminal device, in any one of the third aspect or the possible implementations of the third aspect.

For technical effects brought by any one of the implementations of the fourth aspect, the seventh aspect, the tenth aspect, the thirteenth aspect, and the sixteenth aspect, refer to technical effects brought by different implementations of the first aspect. Details are not described herein again.

For technical effects brought by any one of the implementations of the fifth aspect, the eighth aspect, the eleventh aspect, the fourteenth aspect, and the seventeenth aspect, refer to technical effects brought by different implementations of the second aspect. Details are not described herein again.

For technical effects brought by any one of the implementations of the sixth aspect, the ninth aspect, the fifteenth aspect, and the eighteenth aspect, refer to technical effects brought by different implementations of the third aspect. Details are not described herein again.

In the embodiments of this application, the time synchronization method is used. The head end node regularly sends a timestamp of a closest voltage zero-crossing point to a tail end node, so that the tail end node corrects a locally generated zero-crossing time point of a voltage zero-crossing point after receiving the timestamp of the closest voltage zero-crossing point. In this way, different nodes in the PLC network can implement precise time synchronization between the different nodes based on consistency and a periodicity that are generated based on voltage zero-crossing points, to ensure that the nodes in the PLC network can maintain precise time synchronization, and avoid inconsistency of cyclic waves of synchronously collected data.

DESCRIPTION OF EMBODIMENTS

Figure 1:
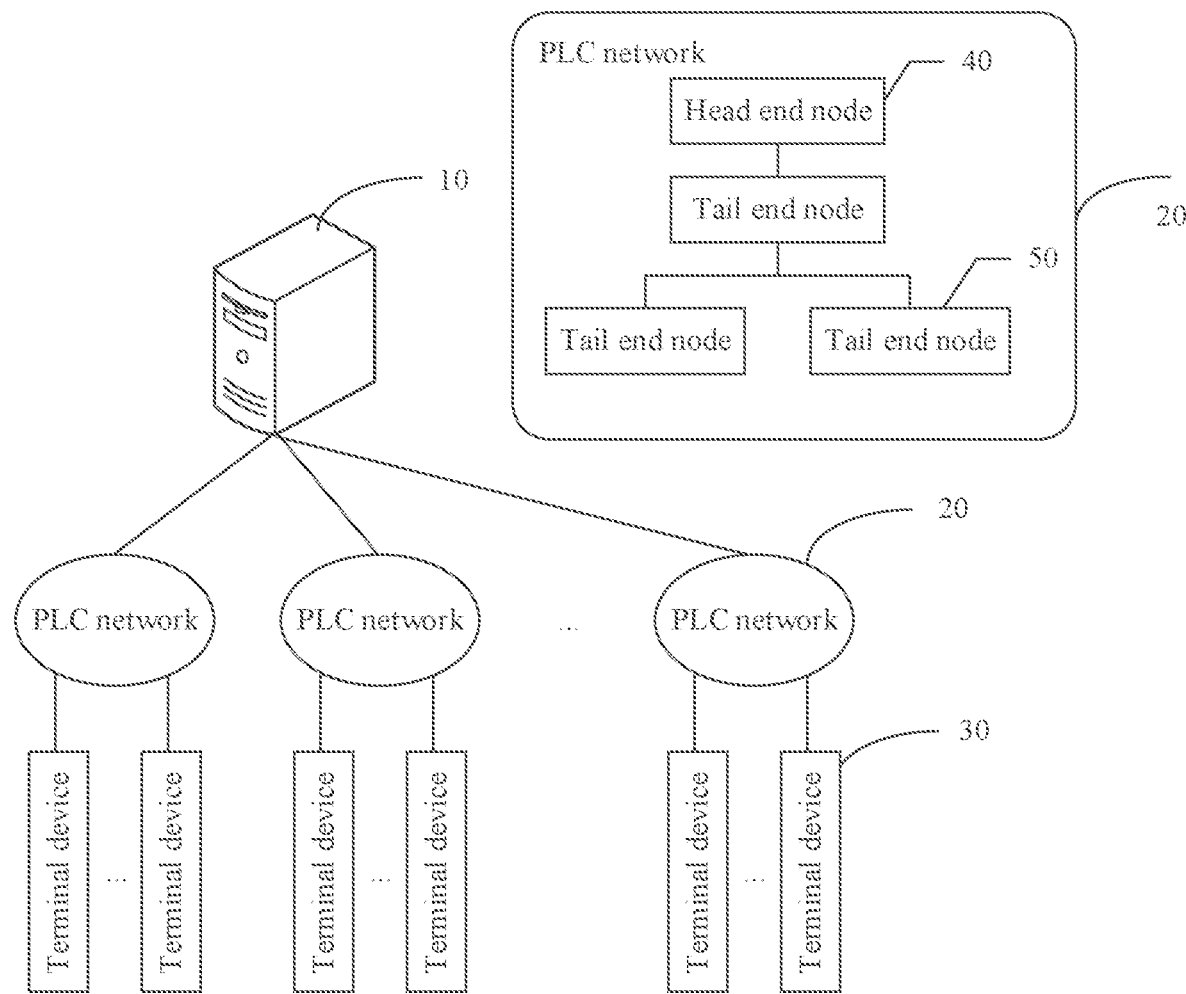
FIG. 1 is a schematic structural diagram of a power communications system according to an embodiment of this application.

To make objectives, technical solutions, and advantages of the present disclosure clearer, the following further describes the embodiments of this application with reference to the accompanying drawings. It is clear that the described embodiments are merely some rather than all of the embodiments of the present disclosure. A person of ordinary skill in the art may learn that, as a new application scenario emerges, the technical solutions provided in the embodiments of the present disclosure are also applicable to a similar technical problem.

In the specification, claims, and accompanying drawings of this application, terms "first", "second", and the like are intended to distinguish between similar objects, but do not necessarily indicate a specific order or sequence. It should be understood that data used in such a way is interchangeable in proper circumstances so that the embodiments described herein can be implemented in an order other than the order illustrated or described herein. In addition, terms "include", "comprise" and any other variant thereof are intended to cover non-exclusive inclusion. For example, a process, a method, a system, a product, or a device that includes a series of steps or modules is not necessarily limited to expressly listing those steps or modules, but may include other steps or modules not expressly listed or inherent to the process, the method, the product, or the device. Naming or numbering on steps in this application does not mean that the steps in the method procedures need to be performed in a time/logical order indicated by a name or number. An execution order of the steps in the procedures that have been named or numbered can be changed based on a technical objective to be achieved, as long as same or similar technical effects can be achieved. Module division in this application is logical division, or may be other division when implemented in actual application. For example, a plurality of modules may be combined or integrated into another system, or some features may be ignored or not performed. In addition, displayed or discussed mutual couplings or direct couplings or communications connections may be implemented through some interfaces. The indirect couplings or communications connections between the modules may be implemented in electrical or other forms. This is not limited in this application. In addition, modules or sub-modules described as separate components may be or may not be physically separated, may be or may not be physical modules, or may be distributed into a plurality of circuit modules. The objectives of the solutions of this application may be achieved by selecting some or all of the modules based on an actual requirement.

PLC is a special communication mode in which high-voltage power lines (35 kilovolts (kV) and higher), medium-voltage power lines (10 kV to 30 kV), or low-voltage power distribution lines (380/220 kV user lines) are used as information transmission media for information transmission. This technology loads a high-frequency signal carrying information to a power line, transmits data through the power line, and separates the high-frequency signal from the power line by using a dedicated power line modulator/demodulator. In this way, communication is implemented.

FIG. 1 is a schematic structural diagram of a power communications system according to an embodiment of this application.

As shown in FIG. 1, the power system includes a management node 10, one or more PLC networks 20, and one or more terminal devices 30. The management node 10 in this embodiment of this application is configured to obtain data from the one or more PLC networks 20 connected to the management node 10, to control and manage running of the power communications system. The management node 10 may be a distribution transformer supervisory terminal unit (TTU), or may be a management server of an e-commerce. The management node 10 may be connected to the terminal device 30 through the PLC network 20, to obtain data information from the terminal device 30.

Each PLC network 20 includes one head end node 40 and one or more tail end nodes 50 connected to the head end node 40 through an electrical wire or electrical wires. FIG. 1 shows a simple structure of a PLC network. It may be understood that, in an actual application process, the PLC network 20 may alternatively include another quantity of tail end nodes 50, and the tail end nodes 50 may be connected at one or more levels. This is not limited in this embodiment of this application. The head end node 40 in the PLC network 20 may be a CCO, and a plurality of tail end nodes may include one or more cascaded PCO, or one or more STAs. That is, the tail end node 50 may be a PCO, or may be a STA. In the PLC network 20, some STAs may be directly connected to the CCO, some STAs cannot be directly connected to the CCO, the STAs are connected to the CCO through one or more cascaded PCOs, and all messages between the CCO and the STAs are forwarded by the one or more cascaded PCOs. When the tail end node 50 is a STA, the STA is connected to at least one terminal device. The head end node 40 or the tail end node 50 may be connected to at least one terminal device 30, or the head end node 40 or the tail end node 50 may not be connected to the terminal device 30. This is not limited in this embodiment of this application.

Figure 2:
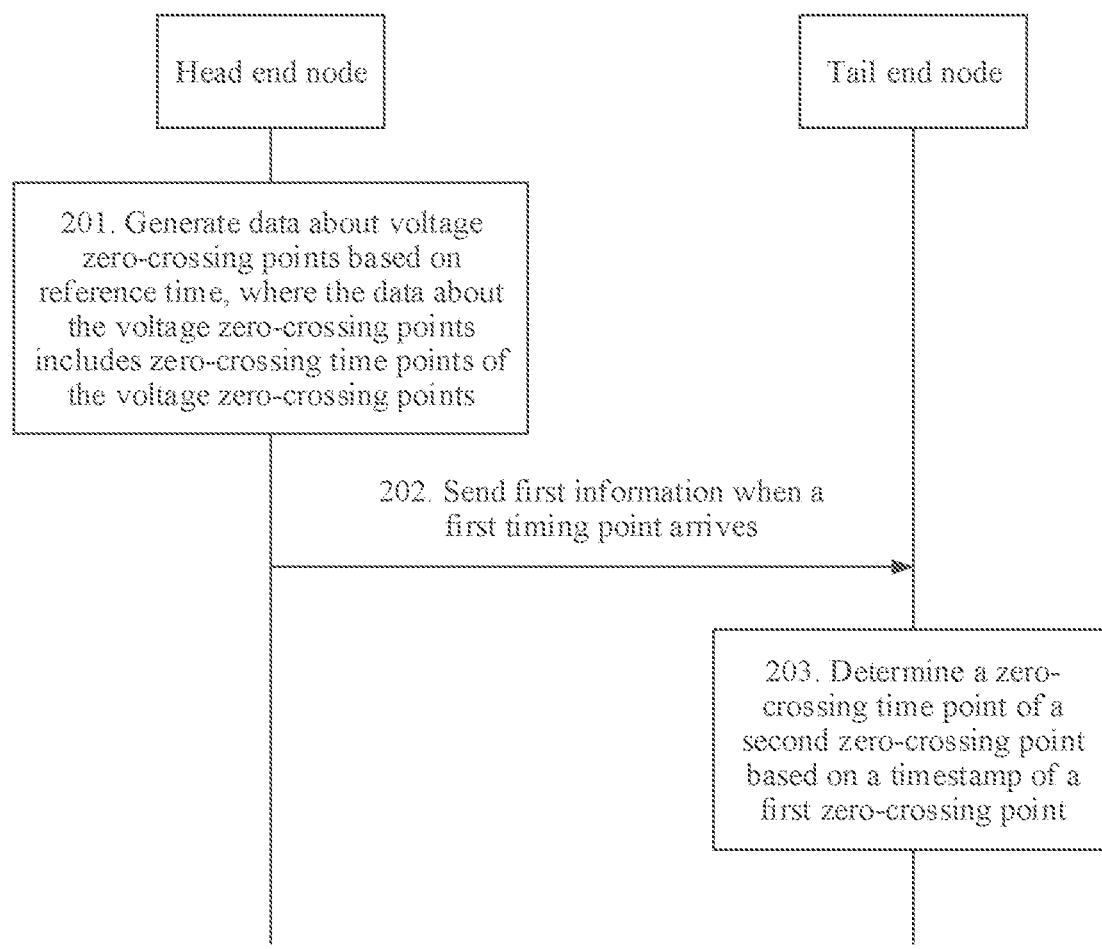
FIG. 2 is a schematic diagram of an embodiment of a time synchronization method according to embodiments of this application.

Based on the PLC network in FIG. 1, FIG. 2 is a schematic diagram of an embodiment of a time synchronization method according to the embodiments of this application.

Referring to FIG. 2, the embodiment of the time synchronization method provided in the embodiments of this application may include the following steps.

201. A head end node generates data about voltage zero-crossing points based on reference time, where the data about the voltage zero-crossing points includes zero-crossing time points of the voltage zero-crossing points.

The head end node and a tail end node in this embodiment of this application each have a function of detecting a voltage zero-crossing point. Further, in this embodiment of this application, a voltage zero-crossing detection circuit may be added to each of the head end node and the tail end node, to detect a voltage zero-crossing point. The voltage zero-crossing detection circuit outputs a signal each time a voltage zero-crossing occurs, to drive the head end node or the tail end node to generate a zero-crossing time point of a voltage zero-crossing point each time the voltage zero-crossing point is generated.

The voltage zero-crossing means that a positive/negative direct current, such as a pulse voltage or an alternating current with a positive/negative amplitude, needs to pass through a zero point before changing from positive to negative or from negative to positive. This zero-crossing point is referred to as a voltage zero-crossing point. The voltage zero-crossing point is irrelevant to a load in a line. The voltage decreases only with an increase of an electricity transmission distance, but a phase and frequency of the voltage do not change. An inductance or a capacitance of the load in the line does not affect generation of voltage zero-crossing points in the line. Therefore, when voltage zero-crossing point detection is performed in any position of a same phase line, a same voltage zero-crossing point is to be generated simultaneously. The voltage zero-crossing detection circuit is a currently mature low-cost circuit design, and is configured to detect a voltage zero-crossing point in a line. Details are not described herein. An alternating current frequency used in daily life is usually 50 Hz or 60 Hz. For example, a 50 Hz alternating current is used in China and Europe. In an example in which a single-phase voltage zero-crossing detection circuit detects voltage zero-crossing points of a 50 Hz alternating current, 100 voltage zero-crossing points are generated per second in the 50 Hz alternating current, that is, voltage of a same phase crosses through zero every 10 ms, therefore, the voltage zero-crossing detection circuit generates a pulse signal every 10 ms, to trigger detection of data related to the voltage zero-crossing points.

Optionally, in addition to the zero-crossing time points of the voltage zero-crossing points, the zero-crossing detection circuit may further drive the head end node or the tail end node to count voltage zero-crossing points each time the voltage zero-crossing points are generated. Further, in an example of the alternating current frequency 50 Hz used in China, a zero voltage is generated every 10 ms in a line, that is, a voltage zero-crossing point is generated. The head end node or the tail end node generates corresponding data about a voltage zero-crossing point each time the voltage zero-crossing point is generated. It should be noted that, for a single-phase alternating current, data about voltage zero-crossing points generated by the head end node or the tail end node includes data about voltage zero-crossing points corresponding to the single phase. For a three-phase alternating current, data about voltage zero-crossing points generated by the head end node or the tail end node includes data about voltage zero-crossing points corresponding to each of three phases.

The reference time in this embodiment of this application may be coordinated universal time. The coordinated universal time is also referred to as unified universal time, universal standard time, or coordinated international time, and is accurate time of a current moment. Optionally, in this embodiment of this application, the head end node may obtain the reference time from an upstream device, for example, a management node or a clock source such as a GPS or BEIDOU.

In this embodiment of this application, the head end node generates the data about the voltage zero-crossing points based on the reference time, and the data about the voltage zero-crossing points includes the zero-crossing time points of the voltage zero-crossing points. In this embodiment of this application, that the head end node generates the data about the voltage zero-crossing point based on the reference time is a continuous process. To be specific, the head end node generates corresponding data based on the reference time when each voltage zero-crossing point is generated.

Optionally, in this embodiment of this application, the data about the voltage zero-crossing points generated by the head end node based on the reference time may further include other information related to the voltage zero-crossing points, for example, zero-crossing counts of the voltage zero-crossing points.

Optionally, in this embodiment of this application, the head end node may periodically obtain reference time, and generate zero-crossing time points of voltage zero-crossing points based on newly obtained reference time each time after obtaining the reference time.

202. When a first timing point arrives, the head end node sends first information to the tail end node, where the first information includes a timestamp of a first zero-crossing point, and the timestamp of the first zero-crossing point is a zero-crossing time point in the zero-crossing time points of the voltage zero-crossing points that has a smallest time interval with the first timing point.

The first timing point in this embodiment of this application may be determined based on a scale of the PLC network. The first timing point may be a multiple of 1 ms. For example, under a condition of an alternating current frequency 50 Hz used in China, the first timing point may be set to 200 voltage zero-crossings, that is, a periodicity of the first timing point is 2 seconds (s).

In this embodiment of this application, after the head end node generates the data about the voltage zero-crossing points based on the reference time, the head end node sends the first information to the tail end node when the first timing point arrives. The first information includes the timestamp of the first zero-crossing point, and the timestamp of the first zero-crossing point is the zero-crossing time point in the zero-crossing time points of the voltage zero-crossing points that has a smallest time interval with the first timing point, where the zero-crossing time points of the voltage zero-crossing points are generated by the head end node based on the reference time. That is, the head end node generates, based on the reference time, a zero-crossing time point or zero-crossing time points corresponding to one or more voltage zero-crossing points. The first zero-crossing point is a voltage zero-crossing point closest to the first timing point. When the first timing point arrives, the head end node sends a recently generated zero-crossing timestamp of a voltage zero-crossing point to the tail end node.

In this embodiment of this application, the first information may be a central beacon, that is, the head end node sends the timestamp of the first zero-crossing point to the tail end node by using the central beacon.

203. The tail end node determines a zero-crossing time point of a second zero-crossing point based on the timestamp of the first zero-crossing point.

The tail end node in this embodiment of this application may be a PCO adjacent to the head end node, or may be a STA adjacent to the head end node. This is not limited in this embodiment of this application. In this embodiment of this application, after receiving the first information sent by the head end node, the tail end node extracts the timestamp of the first zero-crossing point from the first information, and then determines the zero-crossing time point of the second zero-crossing point based on the timestamp of the first zero-crossing point.

Optionally, in this embodiment of this application, when quality of a crystal oscillator used in the head end node and the tail end node is not high, and a detection error of a zero-crossing count may occur, the first information sent by the head end node to the tail end node may further include a zero-crossing count of the first zero-crossing point. After receiving the first information sent by the head end node, the tail end node extracts the timestamp and the zero-crossing count of the first zero-crossing point from the first information, and then determines the zero-crossing time point and a zero-crossing count of the second zero-crossing point based on the timestamp of the first zero-crossing point.

In this embodiment of this application, the tail end node is also driven by the voltage zero-crossing detection circuit to continuously generate zero-crossing time points of voltage zero-crossing points. The second zero-crossing point may be a voltage zero-crossing point that is the same as the first zero-crossing point, or may be a voltage zero-crossing point that is different from the first zero-crossing point. For example, the second zero-crossing point is the $N^{th}$ voltage zero-crossing point generated after the first zero-crossing point. A specific manner in which the tail end node determines the zero-crossing time point of the second zero-crossing point based on the timestamp of the first zero-crossing point may be as follows.

If the second zero-crossing point is a voltage zero-crossing point that is the same as the first zero-crossing point, the tail end node immediately modifies, after receiving the first information, a locally generated zero-crossing time point ti of a first zero-crossing point to the zero-crossing time point $T_1$ of the first zero-crossing point included in the received first information, and generates a zero-crossing time point of each voltage zero-crossing point based on the updated zero-crossing time point $T_1$ of the first zero-crossing point when a subsequent voltage zero-crossing point is generated.

Optionally, if the first information further includes a zero-crossing count M1 of the first zero-crossing point, when the second zero-crossing point is a voltage zero-crossing point that is the same as the first zero-crossing point, in addition to modifying the locally generated zero-crossing time point ti of the first zero-crossing point to the zero-crossing time point $T_1$ of the first zero-crossing point included in the received first information, the tail end node further modifies a locally generated zero-crossing count m1 of the first zero-crossing point to a zero-crossing count M1 of the first zero-crossing point included in the received first information. When a subsequent voltage zero-crossing point is generated, the updated zero-crossing count M1 of the first zero-crossing point increases by 1 each time a voltage zero-crossing point is generated.

If the second zero-crossing point is a voltage zero-crossing point that is different from the first zero-crossing point, for example, the second zero-crossing point is the $N^{th}$ voltage zero-crossing point after the first zero-crossing point, after the tail end node receives the first information, when the second zero-crossing point is generated, if the timestamp of the first zero-crossing point is $T_1$, the tail end node may generate the zero-crossing time point of the second zero-crossing point as $T_1+aN$. When a subsequent voltage zero-crossing point is generated, a zero-crossing time point of each voltage zero-crossing point is generated based on the zero-crossing time point $T_1+aN$ of the second zero-crossing point, where a represents a time interval between zero-crossing time points of every two adjacent voltage zero-crossing points.

In an example of the alternating current frequency 50 Hz, a voltage zero-crossing point is generated every 10 ms, that is, time intervals between zero-crossing time points of every two adjacent voltage zero-crossing points are the same, and the time interval a between the zero-crossing time points of the two adjacent voltage zero-crossing points is equal to 10 ms. When N=1, the second zero-crossing point is the first voltage zero-crossing point generated after the first zero-crossing point. In this case, a zero-crossing time point at which the tail end node generates the second zero-crossing point is $T_1+10$ ms. If N=3, the second zero-crossing point is the third zero-crossing point generated after the first zero-crossing point, and a generation time interval between the second zero-crossing point and the first zero-crossing point is 30 ms. When the second zero-crossing point is generated, a time point at which the tail end node generates the second zero-crossing point is $T_1+30$ ms. It should be noted that, the foregoing describes the specific manner of determining the second zero-crossing point by using the alternating current frequency 50 Hz, and is also applicable to a scenario in which the alternating current frequency is not equal to 50 Hz (for example, the alternating current frequency is 60 Hz). A range of the alternating current frequency is not limited in this embodiment of this application.

Optionally, if the first information further includes a zero-crossing count M1 of the first zero-crossing point, when the second zero-crossing point is the $N^{th}$ voltage zero-crossing point generated after the first zero-crossing point, if the zero-crossing count of the first zero-crossing point is M1, the tail end node not only generates the zero-crossing time point $T_1+aN$ of the second zero-crossing point when the second zero-crossing point is generated, but also generates a zero-crossing count M1+N of the second zero-crossing point. When a subsequent voltage zero-crossing point is generated, the zero-crossing count M1+N of the second zero-crossing point increases by 1 each time a voltage zero-crossing point is generated.

In this embodiment of this application, the head end node regularly sends a timestamp of a closest voltage zero-crossing point to the tail end node, so that the tail end node corrects a locally generated zero-crossing time point of a voltage zero-crossing point after receiving the timestamp of the closest voltage zero-crossing point. In this way, different nodes in the PLC network can implement precise time synchronization between different nodes based on consistency and a periodicity that are generated based on voltage zero-crossing points, to ensure that the nodes in the PLC network can maintain precise time synchronization, and avoid inconsistency of cyclic waves of synchronously collected data.

The foregoing describes the method for synchronizing time between the head end node of the PLC network and the tail end node adjacent to the head end node in this embodiment of this application. When the tail end node in the foregoing embodiment is a PCO, if the PCO still includes a next-level tail end node connected to the PCO, the PCO further needs to implement precise time synchronization with the next-level tail end node connected to the PCO. In some applications, the head end node or the tail end node may be further connected to a terminal device. In this case, precise time synchronization also needs to be implemented between the head end node or the tail end node and the terminal device connected to the head end node or the tail end node. This is further described in the following embodiment of this application.

Figure 3A:
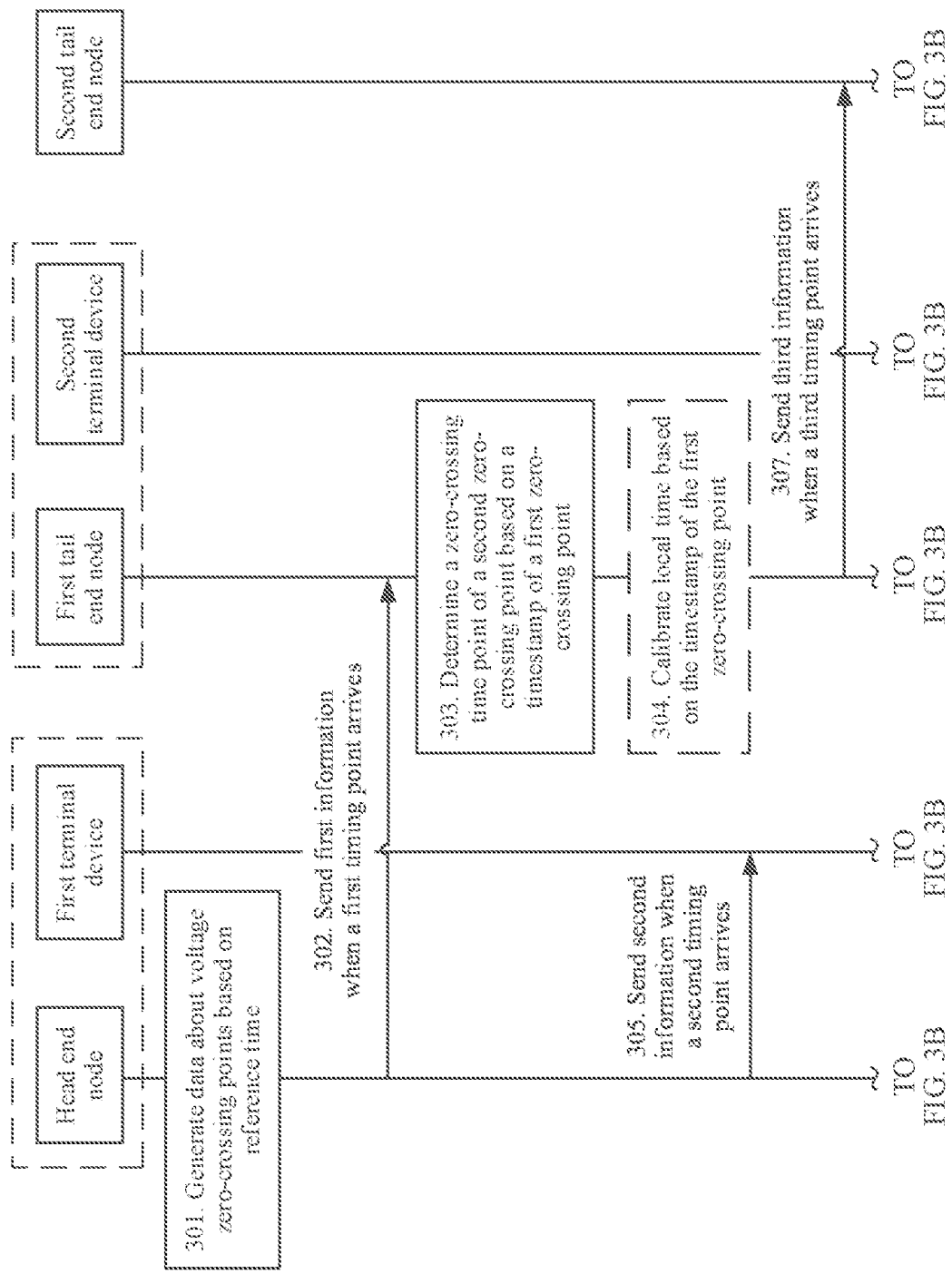
FIG. 3A and FIG. 3B are a schematic diagram of another embodiment of time synchronization method according to embodiments of this application.
Figure 3B:
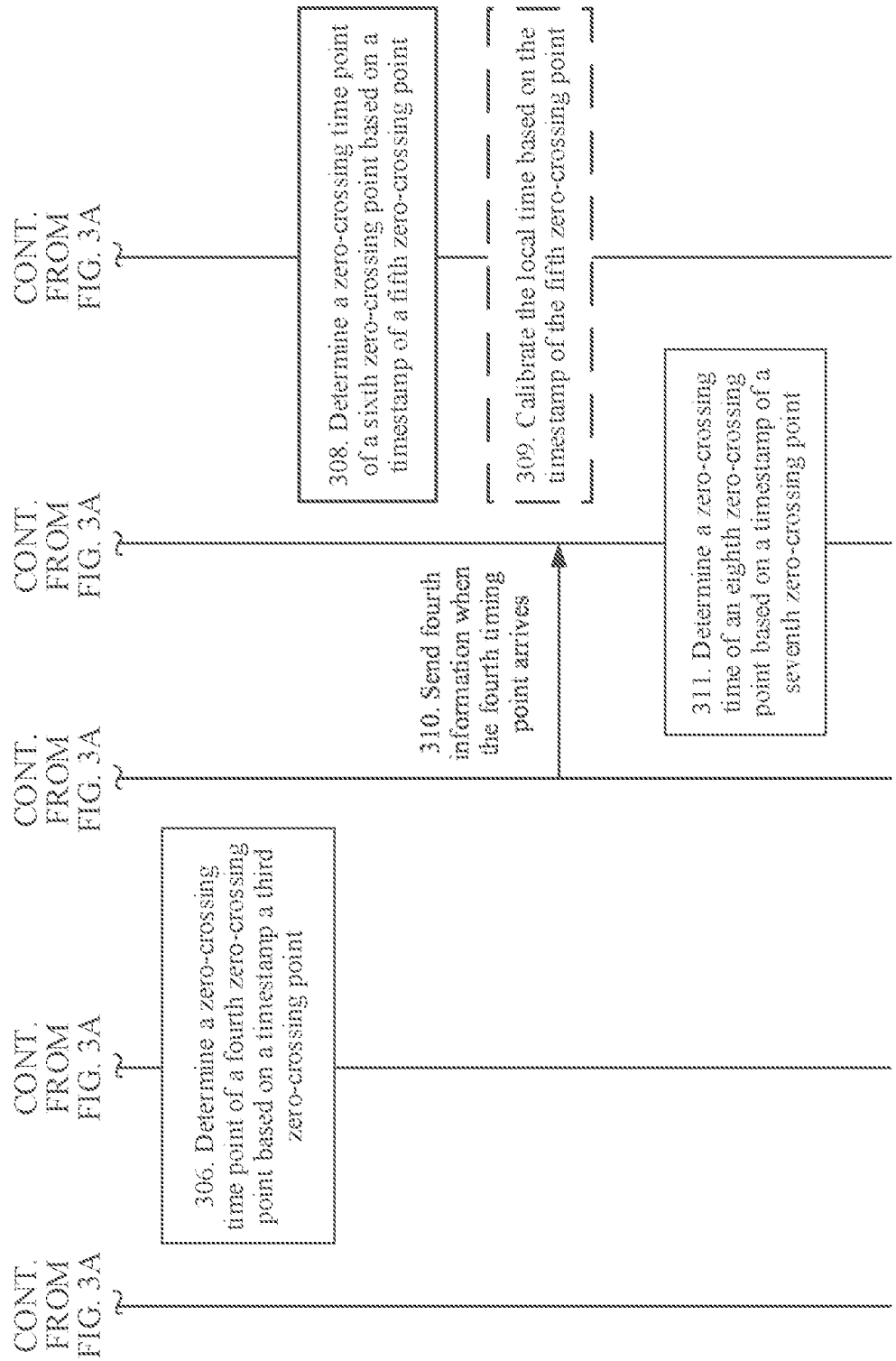

FIG. 3A and FIG. 3B are a schematic diagram of another embodiment of a time synchronization method according to the embodiments of this application.

Referring to FIG. 3A and FIG. 3B, the other embodiment of the time synchronization method provided in the embodiments of this application may include the following steps.

301. A head end node generates data about voltage zero-crossing points based on reference time, where the data about the voltage zero-crossing points includes zero-crossing time points of the voltage zero-crossing points.

For understanding of step 301 in this embodiment of this application, refer to step 201 in FIG. 2. Details are not described herein again.

302. When a first timing point arrives, the head end node sends first information to a first tail end node, where the first information includes a timestamp of a first zero-crossing point, and the timestamp of the first zero-crossing point is a zero-crossing time point in the zero-crossing time points of the voltage zero-crossing points that has a smallest time interval with the first timing point.

For understanding of step 302 in this embodiment of this application, refer to step 202 in FIG. 2. Details are not described herein again.

303. The first tail end node determines a zero-crossing time point of a second zero-crossing point based on the timestamp of the first zero-crossing point.

For understanding of step 303 in this embodiment of this application, refer to step 203 in FIG. 2. Details are not described herein again.

304. The first tail end node calibrates local time based on the timestamp of the first zero-crossing point.

In this embodiment of this application, after receiving the first information sent by the head end node, the first tail end node may further calibrate the local time based on the timestamp of the first zero-crossing point.

In this embodiment of this application, the local time of the first tail end node is current time locally recorded by the first tail end node, and there may be a deviation between the local time and the reference time. Therefore, the first tail end node may further calibrate the local time based on the timestamp of the first zero-crossing point.

Further, a manner in which the first tail end node calibrates the local time based on the timestamp of the first zero-crossing point includes after receiving the first information sent by the head end node and extracting the timestamp of the first zero-crossing point, the first tail end node immediately updates the local time based on the timestamp of the first zero-crossing point, to calibrate the local time.

It should be noted that step 304 in this embodiment of this application is an optional step.

305. The head end node sends second information to a first terminal device when a second timing point arrives, where the second information includes a timestamp of a third zero-crossing point, and the timestamp of the third zero-crossing point is a zero-crossing time point in the zero-crossing time points of the voltage zero-crossing points that has a smallest time interval with the second timing point, where the zero-crossing time points of the voltage zero-crossing points are generated by the head end node.

In this embodiment of this application, the second timing point may be the same as the first timing point, or may be different from the first timing point. That is, after generating the data about the voltage zero-crossing points based on the reference time, the head end node may send corresponding information to the first tail end node and the first terminal device simultaneously, or may send corresponding information to the first tail end node and the first terminal device in sequence. In addition, a periodicity of the first timing point may be greater than or less than a periodicity of the second timing point. This is not limited in this embodiment of this application. For example, the first timing point is set to 200 voltage zero-crossings, that is, the periodicity of the first timing point is 2s, and the second timing point is set to 100 voltage zero-crossings, that is, the periodicity of the second timing point is 1s.

In this embodiment of this application, after the head end node generates the data about the voltage zero-crossing points based on the reference time, when the second timing point arrives, the head end node sends the second information to the first terminal device connected to the head end node. The second information includes the timestamp of the third zero-crossing point, the timestamp of the third zero-crossing point is the zero-crossing time point in the zero-crossing time points of the voltage zero-crossing points that a smallest time interval with the second timing point, that is, the third zero-crossing point is a voltage zero-crossing point closest to a time of arrival of the second timing point. When the second timing point arrives, the head end node sends a zero-crossing timestamp of a recently generated voltage zero-crossing point to the first terminal device.

It should be noted that, in this embodiment of this application, the first terminal device may be any one of one or more terminal devices connected to the head end node. The first terminal device may be connected to the head end node through a UART serial port. The head end node may send the second information to the first terminal device through the UART serial port.

306. The first terminal device determines a zero-crossing time point of a fourth zero-crossing point based on the timestamp of the third zero-crossing point.

In this embodiment of this application, after receiving the second information sent by the head end node, the first terminal device determines the zero-crossing time point of the fourth zero-crossing point based on the timestamp of the third zero-crossing point included in the second information.

Optionally, the head end node and the first terminal device may use a same crystal oscillator, for example, share a voltage zero-crossing detection circuit, or may use different crystal oscillators. When the head end node and the first terminal device use different crystal oscillators, the second information sent by the head end node to the first terminal device may further include a zero-crossing count of the third zero-crossing point.

In this embodiment of this application, the first terminal device is also driven by the voltage zero-crossing detection circuit to continuously generate zero-crossing time points of voltage zero-crossing points. The fourth zero-crossing point may be a voltage zero-crossing point that is the same as the third zero-crossing point, or may be a voltage zero-crossing point that is different from the third zero-crossing point. For example, the fourth zero-crossing point is the $N^{th}$ voltage zero-crossing point generated after the third zero-crossing point. A specific manner in which the first terminal device determines the zero-crossing time point of the fourth zero-crossing point based on the timestamp of the third zero-crossing point may be as follows.

If the fourth zero-crossing point is a voltage zero-crossing point that is the same as the third zero-crossing point, the first terminal device immediately modifies, after receiving the second information, a locally generated zero-crossing time point $t_3$ of the third zero-crossing point to the zero-crossing time point $T_3$ of the third zero-crossing point included in the received second information, and generates a zero-crossing time point of each voltage zero-crossing point based on the updated zero-crossing time point $T_3$ of the third zero-crossing point when a subsequent voltage zero-crossing point is generated.

Optionally, if the second information further includes a zero-crossing count M3 of the third zero-crossing point, when the fourth zero-crossing point is a voltage zero-crossing point that is the same as the third zero-crossing point, in addition to modifying the locally generated zero-crossing time point $t_3$ of the third zero-crossing point to the zero-crossing time point $T_3$ of the third zero-crossing point included in the received second information, the first terminal device further modifies a locally generated zero-crossing count m3 of the third zero-crossing point to a zero-crossing count M3 of the third zero-crossing point included in the received second information. When a subsequent voltage zero-crossing point is generated, the updated zero-crossing count M3 of the third zero-crossing point increases by 1 each time a voltage zero-crossing point is generated.

If the fourth zero-crossing point is a voltage zero-crossing point that is different from the third zero-crossing point, for example, the fourth zero-crossing point is the $N^{th}$ voltage zero-crossing point after the third zero-crossing point, after the first terminal device receives the second information, when the fourth zero-crossing point is generated, if the timestamp of the third zero-crossing point is $T_3$, the first terminal device may generate the zero-crossing time point of the fourth zero-crossing point as $T_3+aN$. When a subsequent voltage zero-crossing point is generated, a zero-crossing time point of each voltage zero-crossing point is generated based on the zero-crossing time $T_3+aN$ of the fourth zero-crossing point, where a represents a time interval between zero-crossing time points of every two adjacent voltage zero-crossing points.

Optionally, if the second information further includes a zero-crossing count M3 of the third zero-crossing point, when the fourth zero-crossing point is the $N^{th}$ voltage zero-crossing point generated after the third zero-crossing point, the first terminal device not only generates the zero-crossing time point of the fourth zero-crossing point as $T_3$ aN when the fourth zero-crossing point is generated, but also generates a zero-crossing count of the fourth zero-crossing point as M3+N. When a subsequent voltage zero-crossing point is generated, the zero-crossing count M3 of the fourth zero-crossing point increases by 1 each time a voltage zero-crossing point is generated.

It should be noted that, for understanding herein, reference may also be made to the method for determining, by the tail end node, the timestamp and the zero-crossing count of the second zero-crossing point based on the timestamp and the zero-crossing count of the first zero-crossing point in step 203 in FIG. 2.

307. When a third timing point arrives, the first tail end node sends third information to a second tail end node, where the third information includes a timestamp of a fifth zero-crossing point, and the timestamp of the fifth zero-crossing point is a zero-crossing time point in the zero-crossing time points of the voltage zero-crossing points that has a smallest time interval with the third timing point, where the zero-crossing time points of the voltage zero-crossing points are generated by the first tail end node based on the zero-crossing time point of the second zero-crossing point.

In this embodiment of this application, after determining the zero-crossing time point of the second zero-crossing point based on the timestamp of the first zero-crossing point, the first tail end node generates data about a subsequent voltage zero-crossing point based on the zero-crossing time point of the second zero-crossing point. The data about the voltage zero-crossing points includes the zero-crossing time points of the voltage zero-crossing points. Optionally, the data about the voltage zero-crossing points may further include zero-crossing counts of the voltage zero-crossing points.

It should be noted that the first tail end node in this embodiment of this application is a PCO, and the first tail end node is further connected to the second tail end node. Therefore, the first tail end node further needs to send the third information to the second tail end node, so that the second tail end node completes precise time synchronization. The third information includes a timestamp of the fifth zero-crossing point, and the timestamp of the fifth zero-crossing point is a zero-crossing time point in the zero-crossing time points of the voltage zero-crossing points that has a smallest time interval with the third timing time point. That is, the fifth zero-crossing point is a voltage zero-crossing point that is closest to a time of arrival of the third timing point. When the third timing point arrives, a zero-crossing timestamp of a recently generated voltage zero-crossing point is sent to the second tail end node. The third information may be a proxy beacon, that is, the first tail end node sends the timestamp of the fifth zero-crossing point to the second tail end node by using the proxy beacon.

In this embodiment of this application, the third timing point may be determined based on a scale of a PLC network. The third timing point may be a multiple of 1 ms. In this embodiment of this application, the third timing point may be the same as at least one of the first timing point and the second timing point, or may be different from both the first timing point and the second timing point. This is not limited in this embodiment of this application.

308. The second tail end node determines a zero-crossing time point of a sixth zero-crossing point based on the timestamp of the fifth zero-crossing point.

In this embodiment of this application, after receiving the third information sent by the first tail end node, the second tail end node determines the zero-crossing time point of the sixth zero-crossing point based on the timestamp of the fifth zero-crossing point in the third information.

Optionally, in this embodiment of this application, when quality of a crystal oscillator used in the first tail end node and the second tail end node is not high, and a detection error of a zero-crossing count may occur, the third information sent by the first tail end node to the second tail end node may further include a zero-crossing count of the fifth zero-crossing point.

In this embodiment of this application, a manner in which the second tail end node determines a timestamp and a zero-crossing count of the sixth zero-crossing point based on the timestamp and the zero-crossing count of the fifth zero-crossing point is the same in principle as a manner in which the tail end node determines the zero-crossing time point of the second zero-crossing point based on the timestamp of the first zero-crossing point in step 203 in FIG. 2. For understanding, refer to step 203 in FIG. 2. Details are not described herein again.

309. The second tail end node calibrates local time based on the timestamp of the fifth zero-crossing point.

For understanding of step 309 in this embodiment of this application, refer to calibration of the local time performed by the first tail end node based on the timestamp of the first zero-crossing point in step 304. Details are not described herein again.

It should be noted that step 309 in this embodiment of this application is an optional step.

310. When a fourth timing point arrives, the first tail end node sends fourth information to a second terminal device, where the fourth information includes a timestamp of a seventh zero-crossing point, and the timestamp of the seventh zero-crossing point is a zero-crossing time point in the zero-crossing time points of the voltage zero-crossing points that has a smallest time interval with the fourth timing interval, where the zero-crossing time points of the voltage zero-crossing points are generated by the first tail end node based on the zero-crossing time point of the second zero-crossing point.

In this embodiment of this application, the second terminal device may be any one of one or more terminal devices connected to the first tail end node. The second terminal device may be connected to the first tail end node through a UART serial port. The first tail end node may send the fourth information to the second terminal device through the UART serial port.

In this embodiment of this application, the fourth timing point may be the same as at least one of the first timing point, the second timing point, and the third timing point, or may be different from each of the first timing point, the second timing point, and the third timing point. This is not limited in this embodiment of this application.

In this embodiment of this application, for understanding of the method for synchronizing time between the first tail end node and the second terminal device, refer to the method for synchronizing time between the head end node and the first terminal device in step 305. Details are not described herein again.

311. The second terminal device determines a zero-crossing time point of an eighth zero-crossing point based on the timestamp of the seventh zero-crossing point.

In this embodiment of this application, after receiving the fourth information sent by the first tail end node, the second terminal device determines the zero-crossing time point of the eighth zero-crossing point based on the timestamp of the seventh zero-crossing point included in the fourth information.

Optionally, the first tail end node and the second terminal device may use a same crystal oscillator, for example, share a voltage zero-crossing detection circuit, or may use different crystal oscillators. When the first tail end node and the second terminal device use different crystal oscillators, the fourth information sent by the first tail end node to the second terminal device may further include a zero-crossing count of the seventh zero-crossing point.

In this embodiment of this application, a manner in which the second terminal device determines a timestamp and a zero-crossing count of the eighth zero-crossing point based on the timestamp and the zero-crossing count of the seventh zero-crossing is the same in principle as the method for determining, by the first terminal device, the zero-crossing time point and the zero-crossing count of the fourth zero-crossing point based on the timestamp and the zero-crossing count of the third zero-crossing point in step 306. For understanding, refer to step 306. Details are not described herein again.

It should be noted that the second tail end node in this embodiment of this application may be a PCO, or may be a STA. If the second tail end node is a PCO, the second tail end node may be further connected to a third tail end node.

By analogy, time synchronization between tail end nodes may be completed in the same manner as the foregoing steps. When the second tail end node is also connected to a corresponding third terminal device, a method for synchronizing time between the second tail end node and the third terminal device is the same as the method for synchronizing time between the first tail end node and the second terminal device.

It should be noted that a sequence of steps 302 and 303 and steps 305 and 306 is not limited in this embodiment of this application. A sequence of steps 307 and 308 and steps 310 and 311 is not limited in this embodiment of this application.

It should be noted that the first tail end node in this embodiment of this application may be a PCO, or may be a STA. If a type of the first tail end node is a STA, the first tail end node is not connected to a next-level tail end node, and step 307 and step 308 do not exist.

It should be noted that, if the head end node or a tail end node is not connected to a terminal device, a solution of time synchronization between the head end node or the tail end node and the terminal device is an optional solution.

In this embodiment of this application, the head end node generates the data about the voltage zero-crossing points based on the reference time, and then regularly sends a timestamp of a closest voltage zero-crossing point to a tail end node and the terminal devices connected to the tail end node, so that all of the devices connected to the head end node can correct locally generated zero-crossing time points of voltage zero-crossing points after receiving the timestamp of the closest voltage zero-crossing point. In this way, all of different nodes and terminal devices in the PLC network can implement precise time synchronization between the different nodes based on consistency and a periodicity that are generated based on the voltage zero-crossing points, to ensure that the nodes in the PLC network can maintain precise time synchronization, and avoid inconsistency of cyclic waves of synchronously collected data.

The time synchronization method provided in the embodiments of this application is described above. The following describes a network device in a PLC network in the embodiments of this application. First, refer to FIG. 4.

The foregoing mainly describes the solutions provided in the embodiments of this application from a perspective of interaction between nodes. It may be understood that, to implement the foregoing functions, the foregoing head end node, tail end node, or terminal device includes corresponding hardware structures and/or software modules performing the functions. A person skilled in the art should be easily aware that, in combination with example modules and algorithm steps described in the embodiments disclosed in this specification, this application can be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of a hardware structure, the head end node or the tail end node may be implemented by a physical device or jointly implemented by a plurality of physical devices, or may be a logical function module inside a physical device, and is not limited in the embodiments of this application.

Figure 4:
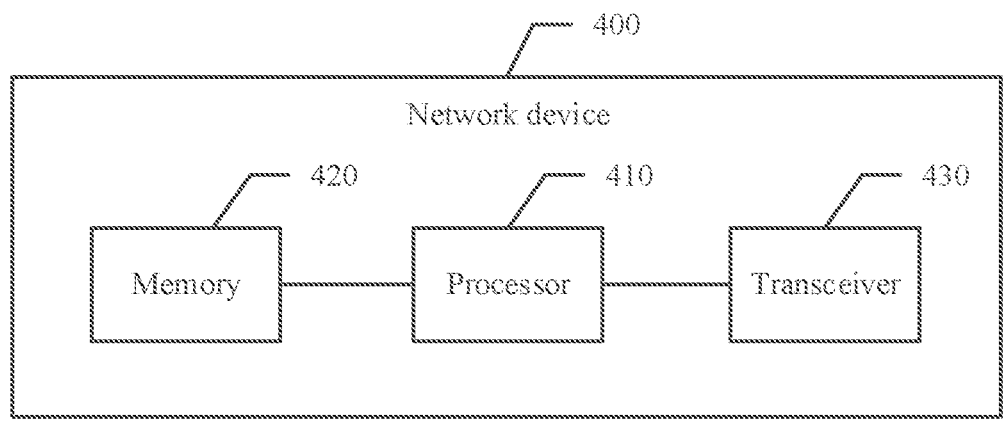
FIG. 4 is a schematic structural diagram of a network device according to an embodiment of this application.

For example, the head end node or any one of the tail end nodes in FIG. 1 to FIG. 3B may be implemented by a network device 400 in FIG. 4. The network device 400 is used in a PLC network, and the PLC network includes a head end node and at least one tail end node connected to the head end node. The network device 400 may be the head end node in FIG. 1 to FIG. 3B, or the network device 400 may be any one of the tail end nodes in FIG. 1 to FIG. 3B. The network device 400 includes a processor 410, a memory 420, and a transceiver 430. The transceiver 430 is configured to communicate with another device or a communications network.

The processor 410 may be a general-purpose central processing unit (CPU), a microprocessor, an application-specific integrated circuit (ASIC), or one or more integrated circuits configured to control program execution of the solutions of this application.

The memory 420 may be a read-only memory (ROM) or another type of static storage device capable of storing static information and an instruction, or a random-access memory (RAM) or another type of dynamic storage device capable of storing information and an instruction, or may be an electrically erasable programmable ROM (PROM) (EEPROM), a compact disc (CD) ROM (CD-ROM) or another CD storage, an optical disc storage (including a CD, a laser disc, an optical disc, a digital versatile disc (DVD), a BLU-RAY disc, or the like), a magnetic disk storage medium or another magnetic storage device, or any other medium capable of carrying or storing expected program code in a form of an instruction or a data structure and accessible by a computer. However, this is not limited thereto. The memory 420 may exist independently, and is connected to the processor 410. The memory 420 may alternatively be integrated with the processor 410.

The memory 420 is configured to store a computer-executable instruction for executing the solutions of this application, and the processor 410 controls the execution. The processor 410 is configured to execute the computer-executable instruction stored in the memory 420, to implement the time synchronization method provided in the embodiments of this application.

Further, when the network device 400 is the head end node in FIG. 1 to FIG. 3B, the processor 410 is configured to generate data about voltage zero-crossing points based on reference time, where the data about the voltage zero-crossing points includes zero-crossing time points of the voltage zero-crossing points, and when a first timing point arrives, send first information to the tail end node, where the first information includes a timestamp of a first zero-crossing point, the timestamp of the first zero-crossing point is a zero-crossing time point in the zero-crossing time points of the voltage zero-crossing points that has a smallest time interval with the first timing point, and the timestamp of the first zero-crossing point is used by the tail end node to determine a zero-crossing time point of a second zero-crossing point. For specific implementation, refer to detailed descriptions of step 201 to step 203 in the embodiment shown in FIG. 2 and detailed descriptions of step 301 to step 303 in the embodiment shown in FIG. 3A. Details are not described herein again.

Further, when the network device 400 is the tail end node in FIG. 1 to FIG. 3B, the processor 410 is configured to receive first information sent by the head end node when a first timing point arrives, where the first information includes a timestamp of a first zero-crossing point, and the timestamp of the first zero-crossing point is a zero-crossing time point in zero-crossing time points of voltage zero-crossing points that has a smallest time interval with the first timing point, where the zero-crossing time points of the voltage zero-crossing points are generated by the head end node based on reference time, and determine a zero-crossing time point of a second zero-crossing point based on the timestamp of the first zero-crossing point. For specific implementation, refer to detailed descriptions of step 201 to step 203 in the embodiment shown in FIG. 2 and detailed descriptions of step 301 to step 303 in the embodiment shown in FIG. 3A. Details are not described herein again.

Optionally, the computer-executable instruction in this embodiment of this application may also be referred to as application program code. This is not limited in this embodiment of this application.

In this embodiment of this application, the network device may be divided into functional modules based on the foregoing method examples. For example, each functional module may be obtained through division for each corresponding function, or two or more functions may be integrated into one processing module. The integrated module may be implemented in a form of hardware, or may be implemented in a form of a software function module. It should be noted that, in this embodiment of this application, division into the modules is an example, and is merely logical function division. During actual implementation, another division manner may be used.

Figure 5:
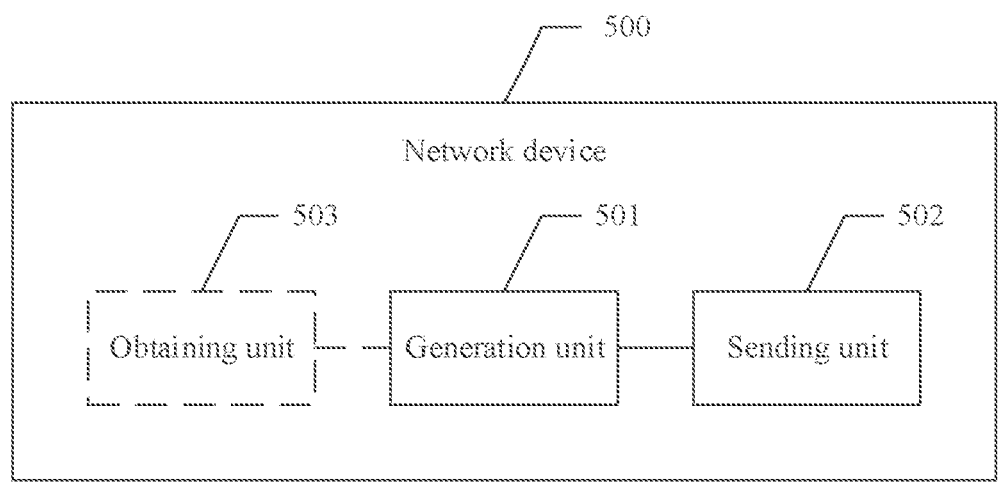
FIG. 5 is another schematic structural diagram of a network device according to an embodiment of this application.

For example, when the functional modules are obtained through division in an integration manner, FIG. 5 is a schematic structural diagram of a network device. The network device 500 corresponds to the head end node in the embodiments in FIG. 1 to FIG. 3B.

Referring to FIG. 5, the network device 500 provided in an embodiment of this application is applied to a PLC network. The network device is the head end node in FIG. 1 to FIG. 3B. The PLC network further includes at least one tail end node connected to the network device. The network device 500 may include a generation unit 501 and a sending unit 502.

The generation unit 501 is configured to generate data about voltage zero-crossing points based on reference time. The data about the voltage zero-crossing points includes zero-crossing time points of the voltage zero-crossing points. For a specific implementation, refer to detailed descriptions of step 201 in the embodiment shown in FIG. 2 and detailed descriptions of step 301 in the embodiment shown in FIG. 3A. Details are not described herein again.

The sending unit 502 is configured to, when a first timing point arrives, send first information to the tail end node. The first information includes a timestamp of a first zero-crossing point, the timestamp of the first zero-crossing point is a zero-crossing time point in the zero-crossing time points of the voltage zero-crossing points that has a smallest time interval with the first timing point, and the timestamp of the first zero-crossing point is used by the tail end node to determine a zero-crossing time point of a second zero-crossing point, where the zero-crossing time points of the voltage zero-crossing points are generated by the generation unit 501. For a specific implementation, refer to detailed descriptions of step 202 and step 203 in the embodiment shown in FIG. 2 and detailed descriptions of step 302 and step 303 in the embodiment shown in FIG. 3A. Details are not described herein again.

In this embodiment of this application, the network device regularly sends a timestamp of a closest voltage zero-crossing point to the tail end node, so that the tail end node corrects a locally generated zero-crossing time point of a voltage zero-crossing point after receiving the timestamp of the closest voltage zero-crossing point. In this way, different nodes in the PLC network can implement precise time synchronization between the different nodes based on consistency and a periodicity that are generated based on the voltage zero-crossing points, to ensure that the nodes in the PLC network can maintain precise time synchronization, and avoid inconsistency of cyclic waves of synchronously collected data.

Optionally, in an embodiment, when the second zero-crossing point is the same as the first zero-crossing point, the zero-crossing time point of the second zero-crossing point is the same as the timestamp of the first zero-crossing point. For a specific implementation, refer to detailed descriptions of step 203 in the embodiment shown in FIG. 2 and detailed descriptions of step 303 in the embodiment shown in FIG. 3A. Details are not described herein again.

Optionally, in an embodiment, the data about the voltage zero-crossing points further includes zero-crossing counts of the voltage zero-crossing points, the first information further includes a zero-crossing count of the first zero-crossing point, and the zero-crossing count of the first zero-crossing point is used by the tail end node to determine a zero-crossing count of the second zero-crossing point. For a specific implementation, refer to detailed descriptions of step 203 in the embodiment shown in FIG. 2 and detailed descriptions of step 303 in the embodiment shown in FIG. 3A. Details are not described herein again.

Optionally, in an embodiment, when the second zero-crossing point is the same as the first zero-crossing point, the zero-crossing count of the second zero-crossing point is the same as the zero-crossing count of the first zero-crossing point. For a specific implementation, refer to detailed descriptions of step 203 in the embodiment shown in FIG. 2 and detailed descriptions of step 303 in the embodiment shown in FIG. 3A. Details are not described herein again.

Optionally, in an embodiment, the timestamp of the first zero-crossing point is further used by the tail end node to calibrate local time. For a specific implementation, refer to detailed descriptions of step 304 in the embodiment shown in FIG. 3A. Details are not described herein again.

Optionally, in an embodiment, the network device 500 is connected to a terminal device. The sending unit is further configured to, after the generation unit 501 generates the data about the voltage zero-crossing points based on the reference time, send second information to the terminal device when a second timing point arrives. The second information includes a timestamp of a third zero-crossing point, the timestamp of the third zero-crossing point is a zero-crossing time point in the zero-crossing time points of the voltage zero-crossing points that has a smallest time interval with the second timing point, and the timestamp of the third zero-crossing point is used by the terminal device to determine a zero-crossing time point of a fourth zero-crossing point. For a specific implementation, refer to detailed descriptions of step 305 and step 306 in the embodiment shown in FIG. 3A and FIG. 3B. Details are not described herein again.

Optionally, in an embodiment, the data about the voltage zero-crossing points further includes the zero-crossing counts of the voltage zero-crossing points, the second information further includes a zero-crossing count of the third zero-crossing point, and the zero-crossing count of the third zero-crossing point is used by the terminal device to determine a zero-crossing count of the fourth zero-crossing point. For a specific implementation, refer to detailed descriptions of step 306 in the embodiment shown in FIG. 3B. Details are not described herein again.

Optionally, in an embodiment, the timestamp of the third zero-crossing point is further used by the terminal device to calibrate the local time.

Optionally, in an embodiment, the network device 500 further includes an obtaining unit 503 configured to, before the generation unit 501 generates the data about the voltage zero-crossing points based on the reference time, obtain the reference time. For a specific implementation, refer to detailed descriptions of step 201 in the embodiment shown in FIG. 2 or detailed descriptions of step 301 in the embodiment shown in FIG. 3A. Details are not described herein again.

It should be understood that the generation unit 501 and the obtaining unit 503 in the foregoing embodiment may be implemented by a processor or a processor-related circuit component, and the sending unit 502 in the foregoing embodiment may be implemented by a transceiver or a transceiver-related circuit component.

In addition, the generation unit 501, the sending unit 502, and the obtaining unit 503 may be software function units, that is, kinetic energy steps of these units described above are implemented by using software. In this case, these software units may be software code stored in the memory 420 in the embodiment shown in FIG. 4. When reading the software code from the memory 420, the processor 410 implements a function of the processor in the embodiment shown in FIG. 4. For details, refer to detailed descriptions of the processor 410 in FIG. 4. Details are not described herein again.

Figure 6:
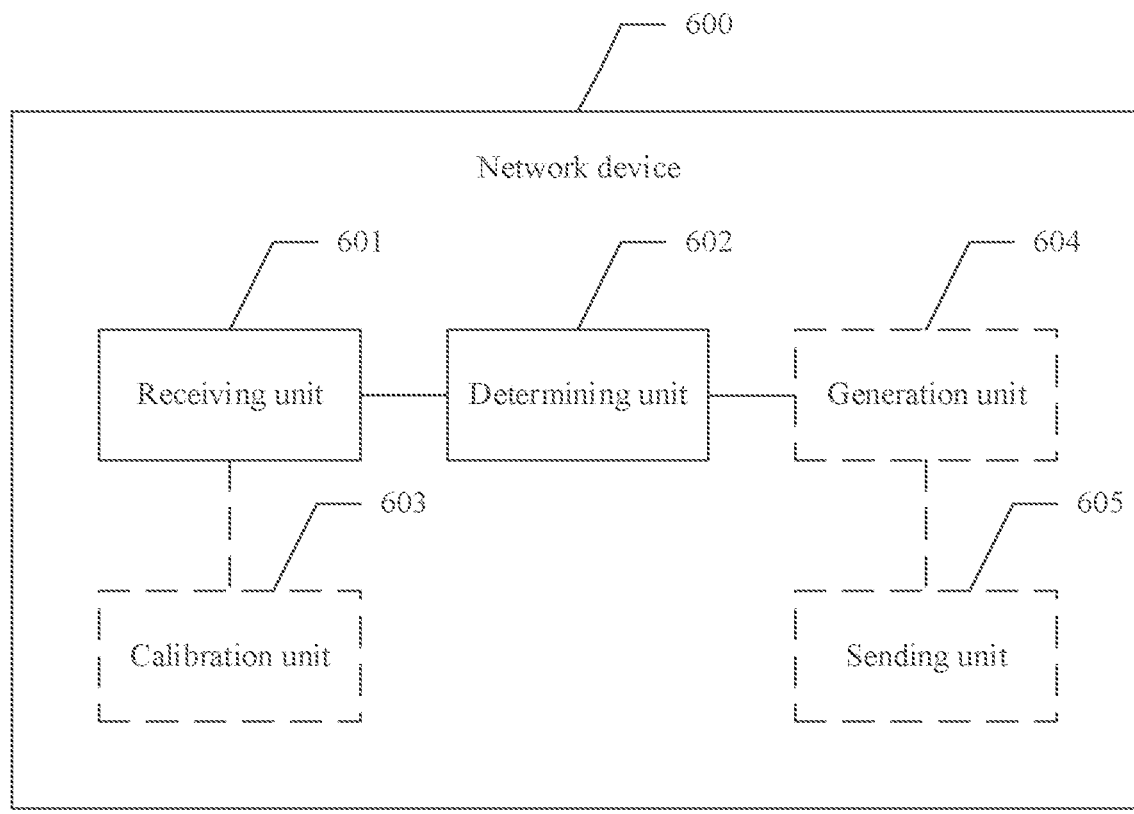
FIG. 6 is another schematic structural diagram of a network device according to an embodiment of this application.

FIG. 6 is a schematic structural diagram of another network device 600 according to an embodiment of this application. The network device 600 corresponds to the tail end node, the first tail end node, or the second tail end node in the embodiments in FIG. 1 to FIG. 3B.

Referring to FIG. 6, this embodiment of this application provides the network device 600. The network device 600 is applied to a PLC network, the PLC network further includes a head end node connected to the network device 600, and the network device 600 may include a receiving unit 601 and a determining unit 602.

The receiving unit 601 is configured to receive first information sent by the head end node when a first timing point arrives. The first information includes a timestamp of a first zero-crossing point, and the timestamp of the first zero-crossing point is a zero-crossing time point in zero-crossing time points of voltage zero-crossing points that has a smallest time interval with the first timing point, where the zero-crossing time points of the voltage zero-crossing points are generated by the head end node based on reference time. For a specific implementation, refer to descriptions of step 201 and step 202 in the embodiment shown in FIG. 2 and detailed descriptions of step 301 and step 302 in the embodiment shown in FIG. 3A. Details are not described herein again.

The determining unit 602 is configured to determine a zero-crossing time point of a second zero-crossing point based on the timestamp of the first zero-crossing point in the first information received by the receiving unit 601. For a specific implementation, refer to detailed descriptions of step 203 in the embodiment shown in FIG. 2 and detailed descriptions of step 303 in the embodiment shown in FIG. 3A and FIG. 3B. Details are not described herein again.

Optionally, in an embodiment, when the first zero-crossing point is the same as the second zero-crossing point, the zero-crossing time point of the second zero-crossing point is the same as the timestamp of the first zero-crossing point. For a specific implementation, refer to detailed descriptions of step 203 in the embodiment shown in FIG. 2 and detailed descriptions of step 303 in the embodiment shown in FIG. 3A. Details are not described herein again.

Optionally, in an embodiment, the first information further includes a zero-crossing count of the first zero-crossing point. The determining unit 602 is further configured to, after the receiving unit 601 receives the first information sent by the head end node when the first timing point arrives, determine a zero-crossing count of the second zero-crossing point based on the zero-crossing count of the first zero-crossing point. For a specific implementation, refer to detailed descriptions of step 203 in the embodiment shown in FIG. 2 and detailed descriptions of step 303 in the embodiment shown in FIG. 3A. Details are not described herein again.

Optionally, in an embodiment, when the second zero-crossing point is the same as the first zero-crossing point, the zero-crossing count of the second zero-crossing point is the same as the zero-crossing count of the first zero-crossing point. For a specific implementation, refer to detailed descriptions of step 203 in the embodiment shown in FIG. 2 and detailed descriptions of step 303 in the embodiment shown in FIG. 3A. Details are not described herein again.

Optionally, in an embodiment, the network device 600 further includes a calibration unit 603 configured to, after the receiving unit 601 receives the first information that is sent by the head end node when the first timing point arrives, calibrate the local time based on the timestamp of the first zero-crossing point. For a specific implementation, refer to detailed descriptions of step 304 in the embodiment shown in FIG. 3A. Details are not described herein again.

Optionally, in an embodiment, the first tail end node is connected to a terminal device. The network device 600 further includes a generation unit 604 configured to, after the determining unit 602 determines the zero-crossing time point of the second zero-crossing point based on the timestamp of the first zero-crossing point, generate data about voltage zero-crossing points based on the zero-crossing time point of the second zero-crossing point, where the data about the voltage zero-crossing points includes zero-crossing time points of the voltage zero-crossing points, and a sending unit 605 configured to send second information to the terminal device when a second timing point arrives, where the second information includes a timestamp of a third zero-crossing point, the timestamp of the third zero-crossing point is a zero-crossing time point in the zero-crossing time points of the voltage zero-crossing points that has a smallest time interval with the second timing point, and the timestamp of the third zero-crossing point is used by the terminal device to determine a zero-crossing time point of a fourth zero-crossing point, where the zero-crossing time points of the voltage zero-crossing points are generated by the generation unit 604. For a specific implementation, refer to detailed descriptions of step 310 and step 311 in the embodiment shown in FIG. 3B. Details are not described herein again.

Optionally, in an embodiment, the data about the voltage zero-crossing points further includes the zero-crossing counts of the voltage zero-crossing points, the second information further includes a zero-crossing count of the third zero-crossing point, and the zero-crossing count of the third zero-crossing point is used by the terminal device to determine a zero-crossing count of the fourth zero-crossing point. For a specific implementation, refer to detailed descriptions of step 311 in the embodiment shown in FIG. 3B. Details are not described herein again.

Optionally, in an embodiment, the timestamp of the third zero-crossing point is further used by the terminal device to calibrate the local time.

Optionally, in an embodiment, the sending unit 605 is further configured to, when a third timing point arrives, send third information to a second tail end node, where the third information includes a timestamp of a fifth zero-crossing point, the timestamp of the fifth zero-crossing point is a zero-crossing time point in the zero-crossing time points of the voltage zero-crossing points that has a smallest time interval with the third timing point, and the timestamp of the fifth zero-crossing point is used by the second tail end node to determine a zero-crossing time point of a sixth zero-crossing point, where the zero-crossing time points of the voltage zero-crossing points are generated by the generation unit 604. For a specific implementation, refer to detailed descriptions of step 307 and step 308 in the embodiment shown in FIG. 3A and FIG. 3B. Details are not described herein again.

Optionally, in an embodiment, the third information further includes a zero-crossing count of the fifth zero-crossing point, and the zero-crossing count of the fifth zero-crossing point is used by the second tail end node to determine a zero-crossing count of the sixth zero-crossing point. For a specific implementation, refer to detailed descriptions of step 308 in the embodiment shown in FIG. 3B. Details are not described herein again.

It should be understood that the determining unit 602, the calibration unit 603, and the generation unit 604 in the foregoing embodiment may be implemented by a processor or a processor-related circuit component, and the receiving unit 601 and the sending unit 605 in the foregoing embodiment may be implemented by a transceiver or a transceiver-related circuit component.

In addition, the receiving unit 601, the determining unit 602, the calibration unit 603, the generation unit 604, and the sending unit 605 may be software function units, that is, kinetic energy steps of these units described above are implemented by using software. In this case, these software units may be software code stored in the memory 420 in the embodiment shown in FIG. 4. When reading the software code from the memory 420, the processor 410 implements a function of the processor in the embodiment shown in FIG. 4. For details, refer to detailed descriptions of the processor 410 in FIG. 4. Details are not described herein again.

Figure 7:
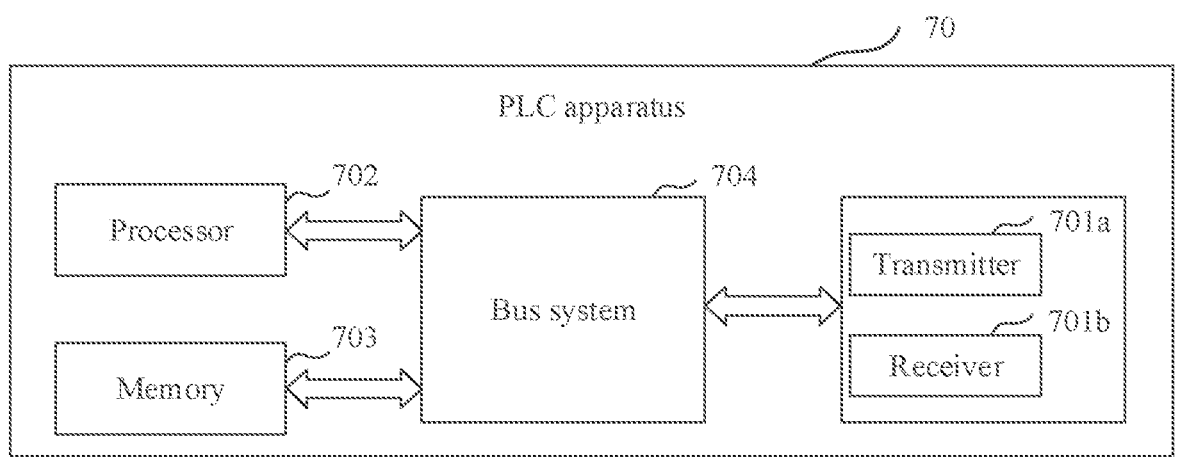
FIG. 7 is a schematic structural diagram of a PLC apparatus according to an embodiment of this application.

An embodiment of this application further provides a PLC apparatus, as shown in FIG. 7. The PLC apparatus 70 includes a transmitter 701a, a receiver 701b, a processor 702, a memory 703, and a bus system 704.

The memory 703 is configured to store a program. Further, the program may include program code, and the program code includes a computer operation instruction. The memory 703 may be a RAM, or may be a non-volatile memory, for example, at least one magnetic disk memory. Only one memory is shown in the figure. Certainly, a plurality of memories may alternatively be set as required. The memory 703 may alternatively be a memory in the processor 702.

The memory 703 stores the following elements, executable modules, or data structures, or subsets or extended sets thereof: an operation instruction that includes various operation instructions and is used to implement various operations, and an operating system that includes various system programs and is used to implement various basic services and process a hardware-based task.

The processor 702 controls an operation of the PLC apparatus 70, and the processor 702 may be a CPU. In a specific application, the components of the PLC apparatus 70 are coupled together by using a bus system 704. In addition to a data bus, the bus system 704 may further include a power bus, a control bus, a status signal bus, and the like. However, for clear description, all types of buses in the figure are marked as the bus system 704. For ease of representation, only illustrative depiction is provided in FIG. 7.

The methods disclosed in the foregoing embodiments of this application may be applied to the processor 702 or implemented by the processor 702.

The processor 702 may be an integrated circuit chip and has a signal processing capability. In an implementation process, the steps in the foregoing methods may be implemented by using a hardware integrated logical circuit in the processor 702 or by using instructions in a form of software. The processor 702 may be a general-purpose processor, a digital signal processor (DSP), an ASIC, a field-programmable gate array (FPGA), or another programmable logic device, a discrete gate or a transistor logic device, or a discrete hardware assembly. The processor may implement or perform the methods, steps, and logical block diagrams that are disclosed in the embodiments of this application. The general-purpose processor may be a microprocessor, or the processor may be any conventional processor, or the like. The steps of the methods disclosed with reference to the embodiments of this application may be directly executed and accomplished by using a hardware decoding processor, or may be executed and accomplished by using a combination of hardware and software modules in a decoding processor. The software module may be located in a storage medium mature in the art, such as a RAM, a flash memory, a ROM, a PROM, an EEPROM, or a register. The storage medium is located in the memory 703, and the processor 702 reads information from the memory 703 and performs, in combination with hardware of the processor 702, the foregoing method steps performed by the head end node or the tail end node.

In some implementations, the processor 702 is configured to read information from the memory 703 to implement the method that is related to the head end node and that is provided in any one of the foregoing aspects and the implementations thereof. Further, the processor 702 is configured to perform the operations performed by the generation unit 501 and the obtaining unit 503 in the foregoing embodiment.

Correspondingly, the transmitter 701a and the receiver 701b are configured to send and receive data, respectively. Further, the transmitter 701a is configured to perform an operation performed by the sending unit 502 in the foregoing embodiment.

In some other implementations, the processor 702 may be further configured to read information from the memory 703 to implement the method that is related to the tail end node and that is provided in any one of the foregoing aspects and the implementations thereof. Further, the processor 702 is configured to perform the operations performed by the determining unit 602, the calibration unit 603, and the generation unit 604 in the foregoing embodiment.

Correspondingly, the transmitter 701a and the receiver 701b are configured to send and receive data, respectively. Further, the transmitter 701a is configured to perform the operation performed by the sending unit 605 in the foregoing embodiment, and the receiver 701b is configured to perform the operation performed by the receiving unit 601 in the foregoing embodiment.

Optionally, in this embodiment of this application, when a voltage zero-crossing detection circuit is added to the head end node or the tail end node to implement voltage zero-crossing detection, the voltage zero-crossing detection circuit may be located inside the processor 702, or may be located outside the processor 702 of the PLC apparatus. A position of the voltage zero-crossing detection circuit is not further limited in this embodiment of this application.

The PLC apparatus 70 in this embodiment of this application may correspond to the head end node or the tail end node in the time synchronization method in the embodiments of this application. In addition, operations and/or functions of the modules in the PLC apparatus 70 are intended to implement corresponding procedures of the methods related to the head end node in FIG. 1 to FIG. 3B. Alternatively, operations and/or functions of the modules in the PLC apparatus 70 are intended to implement corresponding procedures of the methods related to the tail end node in FIG. 1 to FIG. 3B. For brevity, details are not described herein again.

Figure 8:
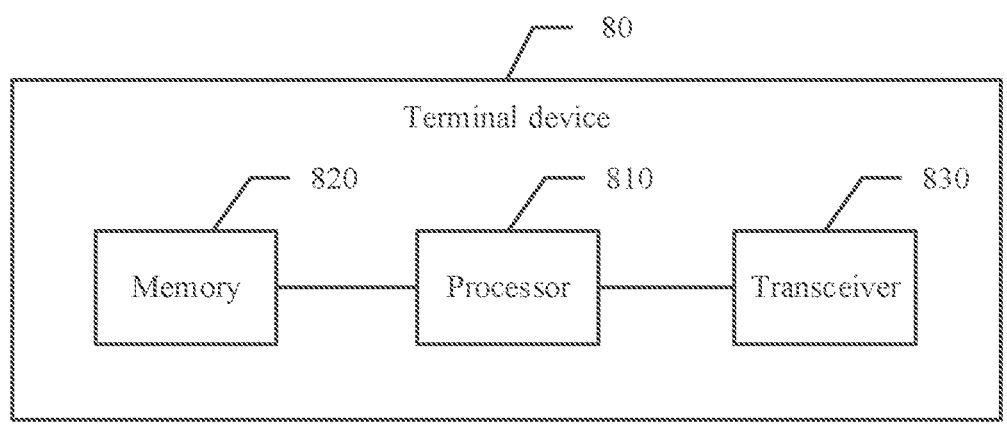
FIG. 8 is a schematic structural diagram of a terminal device according to an embodiment of this application.

As shown in FIG. 8, an embodiment of this application further provides a terminal device 80. The terminal device 80 is used in a PLC network, and the PLC network includes a head end node and at least one tail end node connected to the head end node. The terminal device 80 may be the terminal device in FIG. 1 to FIG. 3B. The terminal device 80 includes a processor 810, a memory 820, and a transceiver 830. The memory 820 stores an instruction or a program. The processor 810 is configured to execute the instruction or the program stored in the memory 820. The transceiver 830 is configured to communicate with another device or a communications network.

The processor 810 may be a general-purpose CPU, a microprocessor, an ASIC, or one or more integrated circuits configured to control program execution of the solutions of this application.

The memory 820 may be a ROM or another type of static storage device capable of storing static information and an instruction, or a RAM or another type of dynamic storage device capable of storing information and an instruction, or may be an EEPROM, a CD-ROM or another CD storage, an optical disc storage (including a CD, a laser disc, an optical disc, a DVD, a BLU-RAY disc, or the like), a magnetic disk storage medium or another magnetic storage device, or any other medium capable of carrying or storing expected program code in a form of an instruction or a data structure and accessible by a computer. However, this is not limited thereto. The memory 820 may exist independently, and is connected to the processor 810. The memory 820 may alternatively be integrated with the processor 810.

The memory 820 is configured to store a computer-executable instruction for executing the solutions of this application, and the processor 810 controls the execution. The processor 810 is configured to execute the computer-executable instruction stored in the memory 820, to implement the time synchronization method provided in the embodiments of this application.

Further, the processor 810 is configured to receive first information sent by a first node when a first timing point arrives, where the first information includes a timestamp of a first zero-crossing point, and the timestamp of the first zero-crossing point is a zero-crossing time point in zero-crossing time points of voltage zero-crossing points that has a smallest time interval with the first timing point, where the zero-crossing time points of the voltage zero-crossing points are generated by the first node, and determine a timestamp of a second zero-crossing point based on the timestamp of the first zero-crossing point. For specific implementation, refer to detailed descriptions of steps 305 and 306 and steps 310 and 311 in the embodiment shown in FIG. 3A and FIG. 3B. Details are not described herein again.

Optionally, the computer-executable instruction in this embodiment of this application may also be referred to as application program code. This is not limited in this embodiment of this application.

In this embodiment of this application, the terminal device may be divided into functional modules based on the foregoing method examples. For example, each functional module may be obtained through division for each function, or two or more functions may be integrated in one processing module. The integrated module may be implemented in a form of hardware, or may be implemented in a form of a software function module. It should be noted that, in this embodiment of this application, division into the modules is an example, and is merely logical function division. During actual implementation, another division manner may be used.

Figure 9:
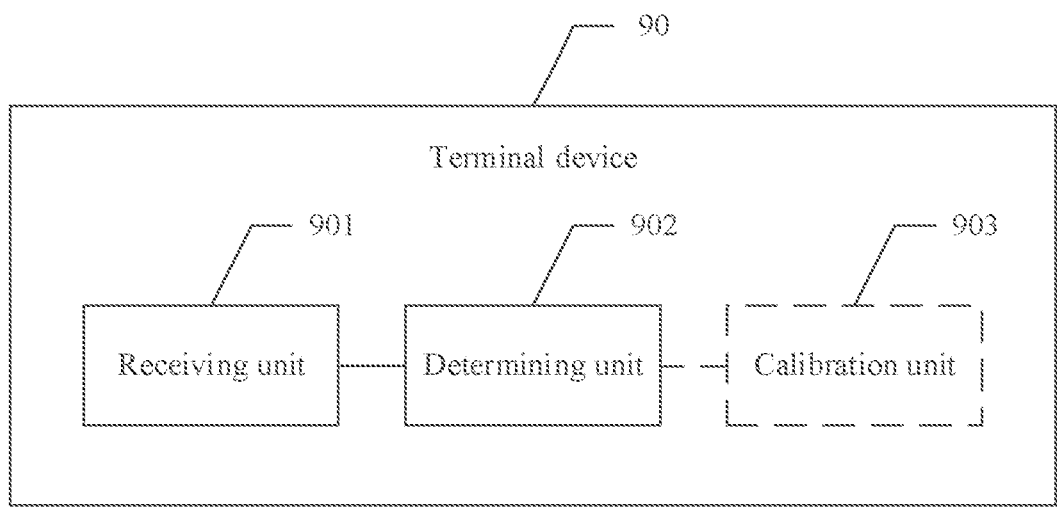
FIG. 9 is another schematic structural diagram of a terminal device according to an embodiment of this application.

For example, when the functional modules are obtained through division in an integration manner, FIG. 9 is a schematic structural diagram of a terminal device. The terminal device 90 corresponds to the terminal device, the first terminal device, or the second terminal device in the embodiments in FIG. 1 to FIG. 3B.

Referring to FIG. 9, the terminal device 90 provided in an embodiment of this application may include a receiving unit 901 and a determining unit 902.

The receiving unit 901 is configured to receive first information sent by a first node when a first timing point arrives. The first information includes a timestamp of a first zero-crossing point, and the timestamp of the first zero-crossing point is a zero-crossing time point in zero-crossing time points of voltage zero-crossing points that has a smallest time interval with the first timing point, where the zero-crossing time points of the voltage zero-crossing points are generated by the first node. For a specific implementation, refer to detailed descriptions of step 305 or step 310 in the embodiment shown in FIG. 3A and FIG. 3B. Details are not described herein again.

The determining unit 902 is configured to determine a timestamp of a second zero-crossing point based on the timestamp of the first zero-crossing point in the information received by the receiving unit 901. For a specific implementation, refer to detailed descriptions of step 306 or step 311 in the embodiment shown in FIG. 3A and FIG. 3B. Details are not described herein again.

Optionally, in an embodiment, when the first node is the head end node, the zero-crossing time points of the voltage zero-crossing points are generated by the first node based on reference time. For a specific implementation, refer to detailed descriptions of step 201 in the embodiment shown in FIG. 2 and detailed description of step 301 in the embodiment shown in FIG. 3A and FIG. 3B. Details are not described herein again.

Optionally, in an embodiment, when the first node is the tail end node, the zero-crossing time points of the voltage zero-crossing points are generated by the first node based on a timestamp of a third zero-crossing point. The timestamp of the third zero-crossing point is sent by a second node to the first node when a second timing point arrives, and the timestamp of the third zero-crossing point is a zero-crossing time point in timestamps of voltage zero-crossing points that has a smallest time interval with the second timing point, where the timestamps of the voltage zero-crossing points are generated by the second node. For a specific implementation, refer to detailed descriptions of step 310 in the embodiment shown in FIG. 3A and FIG. 3B. Details are not described herein again.

Optionally, in an embodiment, the first information further includes a zero-crossing count of the first zero-crossing point. The determining unit 902 is further configured to determine a zero-crossing count of the second zero-crossing point based on the zero-crossing count of the first zero-crossing point. For a specific implementation, refer to detailed descriptions of step 306 in the embodiment shown in FIG. 2 and detailed descriptions of step 311 in the embodiment shown in FIG. 3A and FIG. 3B. Details are not described herein again.

Optionally, in an embodiment, the terminal device 90 further includes a calibration unit 903 configured to, after the receiving unit receives the first information sent by the first node when the first timing point arrives, calibrate local time based on the timestamp of the first zero-crossing point. For a specific implementation, refer to detailed descriptions of step 304 and step 309 in the embodiment shown in FIG. 3A and FIG. 3B. Details are not described herein again.

It should be understood that the determining unit 902 and the calibration unit 903 in the foregoing embodiment may be implemented by a processor or a processor-related circuit component, and the receiving unit 901 in the foregoing embodiment may be implemented by a transceiver or a transceiver-related circuit component.

In addition, the determining unit 902, the calibration unit 903, and the receiving unit 901 may be software function units, that is, kinetic energy steps of these units described above are implemented by using software. In this case, these software units may be software code stored in the memory 820 in the embodiment shown in FIG. 8. When reading the software code from the memory 820, the processor 810 implements a function of the processor in the embodiment shown in FIG. 8. For details, refer to detailed descriptions of the processor 810 in FIG. 8. Details are not described herein again.

Optionally, an embodiment of this application provides a chip system. The chip system includes a processor configured to support a head end node in implementing the foregoing time synchronization method. In a possible design, the chip system further includes a memory. The memory is configured to store a program instruction and data that are necessary for the head end node. The chip system may include a chip, or may include a chip and another discrete device, for example, a modulation and encoding/decoding physical device or a digital-to-analog conversion module, and is not limited in this embodiment of this application. It should be noted that the memory may be located outside the chip system. The processor of the chip system interacts with a storage device outside the chip to perform the synchronization method performed by the head end node. For a specific implementation process, refer to detailed descriptions of step 201 and step 202 in the embodiment shown in FIG. 2, and detailed descriptions of step 301, step 302, and step 305 in the embodiment shown in FIG. 3A. Details are not described herein again.

Optionally, an embodiment of this application provides a chip system. The chip system includes a processor configured to support a tail end node in implementing the foregoing time synchronization method. In a possible design, the chip system further includes a memory. The memory is configured to store a program instruction and data that are necessary for the tail end node. The chip system may include a chip, or may include a chip and another discrete device, for example, a modulation and encoding/decoding physical device or a digital-to-analog conversion module, and is not limited in this embodiment of this application. It should be noted that the memory may be located outside the chip system. The processor of the chip system interacts with a storage device outside the chip to perform the synchronization method performed by the tail end node. For a specific implementation process, refer to detailed descriptions of step 203 in the embodiment shown in FIG. 2, and detailed descriptions of step 303, step 304, step 307, and step 310 in the embodiment shown in FIG. 3A and FIG. 3B. Details are not described herein again.

Optionally, an embodiment of this application provides a chip system. The chip system includes a processor configured to support a terminal device in implementing the foregoing time synchronization method. In a possible design, the chip system further includes a memory. The memory is configured to store a program instruction and data that are necessary for the terminal device. The chip system may include a chip, or may include a chip and another discrete device, for example, a modulation and encoding/decoding physical device or a digital-to-analog conversion module, and is not limited in this embodiment of this application. It should be noted that the memory may be located outside the chip system. The processor of the chip system interacts with a storage device outside the chip to perform the synchronization method performed by the tail end node. For a specific implementation process, refer to detailed descriptions of step 306 and step 311 in the embodiment shown in FIG. 3B. Details are not described herein again.

This application further provides a PLC communications system. The PLC communications system includes the foregoing head end node and the foregoing one or more tail end nodes connected to the head end node. Optionally, the PLC communications system may further include one or more of the foregoing terminal devices. The head end node, the tail end node, and the terminal device in this embodiment may be the head end node, the tail end node, and the terminal device that are described in FIG. 1 to FIG. 9.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the apparatus embodiment described above is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

When the functions are implemented in a form of a software function unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a Universal Serial Bus (USB) flash drive, a removable hard disk, a ROM, a RAM, a magnetic disk, or an optical disc.

The foregoing describes in detail the time synchronization method, the apparatus, and the storage medium that are provided in the embodiments of this application. Principles and implementations of this application are described in this specification by using specific examples. The descriptions of the foregoing embodiments are merely provided to help understand the method and core ideas of this application. In addition, a person of ordinary skill in the art can make variations and modifications to this application in terms of the specific implementations and application scopes based on the ideas of this application. Therefore, the content of this specification shall not be construed as a limit to this application.

What is claimed is:

1. A time synchronization method implemented by a head end node of a power-line communication (PLC) network, wherein the time synchronization method comprises:
    generating, based on a reference time, data about voltage zero-crossing points, wherein the data comprise zero-crossing time points of the voltage zero-crossing points; and
    sending, to a tail end node of the PLC network when a first timing point arrives, first information to enable the tail end node to determine a second zero-crossing time point of a second zero-crossing point,
    wherein the first information comprises a first timestamp of a first zero-crossing point,
    wherein the first timestamp is a first zero-crossing time point that is in the zero-crossing time points and that has a smallest time interval with the first timing point.

2. The time synchronization method of claim 1, further comprising:
    identifying that the second zero-crossing point is the same as the first zero-crossing point, and
    determining, in response to the identifying, that the second zero-crossing time point is the same as the first timestamp.

3. The time synchronization method of claim 1, wherein the data further comprises zero-crossing counts of the voltage zero-crossing points, wherein the first information further comprises a first zero-crossing count of the first zero-crossing point, and wherein the first zero-crossing count enables the tail end node to determine a second zero-crossing count of the second zero-crossing point.

4. The time synchronization method of claim 3, further comprising:
    identifying that the second zero-crossing point is the same as the first zero-crossing point; and
    determining, in response to the identifying, that the second zero-crossing count is the same as the first zero-crossing count.

5. The time synchronization method of claim 1, wherein the first timestamp further enables the tail end node to calibrate a local time.

6. The time synchronization method of claim 1, wherein the head end node is coupled to a terminal device, wherein after generating the data, the time synchronization method further comprises sending second information to the terminal device when a second timing point arrives, wherein the second information comprises a second timestamp of a third zero-crossing point, wherein the second timestamp is a third zero-crossing time point that is in the zero-crossing time points and that has a smallest time interval with the second timing point, and wherein the second timestamp enables the terminal device to determine a fourth zero-crossing time point of a fourth zero-crossing point.

7. The time synchronization method of claim 6, wherein the data further comprise zero-crossing counts of the voltage zero-crossing points, wherein the second information further comprises a first zero-crossing count of the third zero-crossing point, and wherein the first zero-crossing count enables the terminal device to determine a second zero-crossing count.

8. The time synchronization method of claim 6, wherein the second timestamp further enables the terminal device to calibrate a local time.

9. The time synchronization method of claim 1, wherein before generating the data, the time synchronization method further comprises obtaining the reference time.

10. A time synchronization method implemented by a tail end node of a power-line communication (PLC) network, wherein the time synchronization method comprises:
   receiving first information from a head end node of the PLC network when a first timing point arrives, wherein the first information comprises a first timestamp of a first zero-crossing point, wherein the first timestamp is a first zero-crossing time point that is in zero-crossing time points of voltage zero-crossing points and that has a smallest time interval with the first timing point, and wherein the zero-crossing time points are based on a reference time; and
   determining a second zero-crossing time point of a second zero-crossing point based on the first timestamp.

11. The time synchronization method of claim 10, wherein the second zero-crossing time point is the same as the first timestamp when the first zero-crossing point is the same as the second zero-crossing point.

12. The time synchronization method of claim 10, wherein the first information further comprises a first zero-crossing count of the first zero-crossing point, and wherein after receiving the first information, the time synchronization method further comprises determining a second zero-crossing count of the second zero-crossing point based on the first zero-crossing count.

13. The time synchronization method of claim 12, further comprising:
   identifying that the second zero-crossing point is the same as the first zero-crossing point; and
   determining, in response to the identifying, that the second zero-crossing count is the same as the first zero-crossing count.

14. The time synchronization method of claim 10, wherein after receiving the first information, the time synchronization method further comprises calibrating a local time based on the first timestamp.

15. The time synchronization method of claim 10, wherein the first tail end node is coupled to a terminal device, and wherein after determining the second zero-crossing time point, the time synchronization method further comprises:
   generating data about the voltage zero-crossing points based on the second zero-crossing time point, wherein the data comprise the zero-crossing time points; and
   sending second information to the terminal device when a second timing point arrives, wherein the second information comprises a second timestamp of a third zero-crossing point, wherein the second timestamp is a third zero-crossing time point that is in the zero-crossing time points and that has a smallest time interval with the second timing point, wherein the second timestamp enables the terminal device to determine a fourth zero-crossing time point of a fourth zero-crossing point.

16. A time synchronization method implemented by a terminal device of a power-line communication (PLC) network, wherein the time synchronization method comprises:
   receiving first information from a first node when a first timing point arrives, wherein the first information comprises a first timestamp of a first zero-crossing point, and wherein the first timestamp is a first zero-crossing time point that is in zero-crossing time points of voltage zero-crossing points and that has a smallest time interval with the first timing point; and
   determining a second timestamp of a second zero-crossing point based on the first timestamp.

17. A network device comprising:
   a memory configured to store computer-readable instructions; and
   a processor coupled to the memory, wherein the computer-readable instructions cause the processor to be configured to:
      generate data about voltage zero-crossing points based on a reference time, wherein the data comprise zero-crossing time points of the voltage zero-crossing points; and
      send first information to a tail end node when a first timing point arrives,
      wherein the first information comprises a timestamp of a first zero-crossing point,
      wherein the timestamp is a first zero-crossing time point that is in the zero-crossing time points and that has a smallest time interval with the first timing point, and
      wherein the timestamp enables the tail end node to determine a second zero-crossing time point of a second zero-crossing point.

18. A terminal device comprising:
   a memory configured to store computer-readable instructions; and
   a processor coupled to the memory, wherein the computer-readable instructions cause the processor to be configured to:
      receive first information from a first node when a first timing point arrives, wherein the first information comprises a first timestamp of a first zero-crossing point, wherein the first timestamp is a first zero-crossing time point that is in zero-crossing time points of voltage zero-crossing points and that has a smallest time interval with the first timing point; and
      determine a second timestamp of a second zero-crossing point based on the first timestamp.

19. A power-line communication (PLC) communications system comprising:
   a head end node configured to:
      generate data about voltage zero-crossing points based on a reference time, wherein the data comprise zero-crossing time points of the voltage zero-crossing points; and
      send first information when a first timing point arrives, wherein the first information comprises a first timestamp of a first zero-crossing point, and wherein the first timestamp is a first zero-crossing time point that is in the zero-crossing time points and that has a smallest time interval with the first timing point; and
   a tail end node coupled to the head end node and configured to:
      receive the first information from the head end node; and
      determine a second zero-crossing time point of a second zero-crossing point based on the first timestamp.

20. The PLC communications system of claim 19, further comprising a terminal device and configured to:

receive the first information from a first node when the first timing point arrives; and determine a second timestamp of the second zero-crossing point based on the first timestamp.

* * * * *

UNITED STATES PATENT AND TRADEMARK OFFICE
CERTIFICATE OF CORRECTION

PATENT NO. : 11,575,493 B2
APPLICATION NO. : 17/245704
DATED : February 7, 2023
INVENTOR(S) : Yueping Leng and Kuichao Song It is certified that error appears in the above-identified patent and that said Letters Patent is hereby corrected as shown below:

In the Claims

Claim 20, Column 44, Line 67: "device and configured" should read "device coupled to at least one of the head node or a tail end node and configured"

Signed and Sealed this
Twenty-eighth Day of March, 2023

Katherine Kelly Vidal
Director of the United States Patent and Trademark Office